(12) United States Patent  
Koyama et al.

(10) Patent No.: US 9,282,332 B2
(45) Date of Patent: Mar. 8, 2016

(54) VIDEO ENCODING APPARATUS AND VIDEO DECODING APPARATUS

(71) Applicant: FUJITSU LIMITED, Kawasaki-shi, Kanagawa (JP)

(72) Inventors: Junpei Koyama, Shibuya (JP); Kimihiko Kazui, Kawasaki (JP); Satoshi Shimada, Kawasaki (JP); Akira Nakagawa, Sagamihara (JP); Akihiro Yamori, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 695 days.

(21) Appl. No.: 13/632,338

(22) Filed: Oct. 1, 2012

(65) Prior Publication Data

US 2013/0114722 A1    May 9, 2013

(30) Foreign Application Priority Data

Nov. 7, 2011   (JP) .................................. 2011-243623

(51) Int. Cl.
*H04N 7/32* (2006.01)
*H04N 19/16* (2014.01)
*H04N 19/52* (2014.01)
*H04N 19/176* (2014.01)
*H04N 19/513* (2014.01)

(52) U.S. Cl.
CPC ............. *H04N 19/16* (2014.11); *H04N 19/176* (2014.11); *H04N 19/513* (2014.11); *H04N 19/52* (2014.11)

(58) Field of Classification Search
CPC combination set(s) only.
See application file for complete search history.

(56) References Cited

U.S. PATENT DOCUMENTS

| 2009/0175340 A1* | 7/2009 | Soh et al. | 375/240.15 |
| 2009/0175341 A1* | 7/2009 | Soh et al. | 375/240.15 |
| 2009/0245376 A1* | 10/2009 | Choi et al. | 375/240.16 |
| 2012/0121017 A1* | 5/2012 | Chen et al. | 375/240.15 |
| 2012/0189053 A1* | 7/2012 | Chen et al. | 375/240.12 |

OTHER PUBLICATIONS

Benjamin Bross et al., "WD4: Working Draft 4 of High-Efficiency Video Coding", Jul. 2011, pp. 1-218.
(Continued)

*Primary Examiner* — Dave Czekaj
*Assistant Examiner* — Kehinde O Abimbola
(74) *Attorney, Agent, or Firm* — Staas & Halsey LLP

(57) ABSTRACT

A video encoding apparatus includes: a reference vector deriving unit to derive as a reference vector a vector used when encoding a block that is near a block to be encoded and is included in a region where a field picture to be encoded is subjected to encode; a scaling unit to scale the reference vector based on a temporal distance between the field picture and a first encoded field picture specified by the reference vector and a temporal distance between the field picture and a second encoded field picture specified by a reference index and referenced by the block to be encoded in the field picture to generate a motion prediction vector; and a motion prediction vector correction unit to correct the motion prediction vector using a parity of the field picture, a parity of the first encoded field picture, and a parity of the second encoded field picture.

14 Claims, 24 Drawing Sheets

(56) References Cited

OTHER PUBLICATIONS

International Telecommunication Union, "Information Technology—Generic coding of moving pictures and associated audio information: Video (Series H: Audiovisual and Multimedia Systems Infrastructure of audiovisual services—Coding of moving video)", ITU-T Recommendation H.262, Feb. 2000, pp. 1-206.

International Telecommunication Union, "Advanced video coding for generic audiovisual services (Series H: Audiovisual and Multimedia Systems Infrastructure of audiovisual services—Coding of moving video)", ITU-T Recommendation H.264, Nov. 2007, pp. 1-540.

* cited by examiner

FIG. 8A

| INDEX | ENCODED DATA |
|---|---|
| 0 | 1 |
| 1 | 01 |
| 2 | 001 |
| 3 | 0001 |
| 4 | 0000 |

IN CASE WHERE (MAXIMUM) NUMBER OF CANDIDATES IS 5

FIG. 8B

| INDEX | ENCODED DATA |
|---|---|
| 0 | 1 |
| 1 | 01 |
| 2 | 00 |

IN CASE WHERE (MAXIMUM) NUMBER OF CANDIDATES IS 3

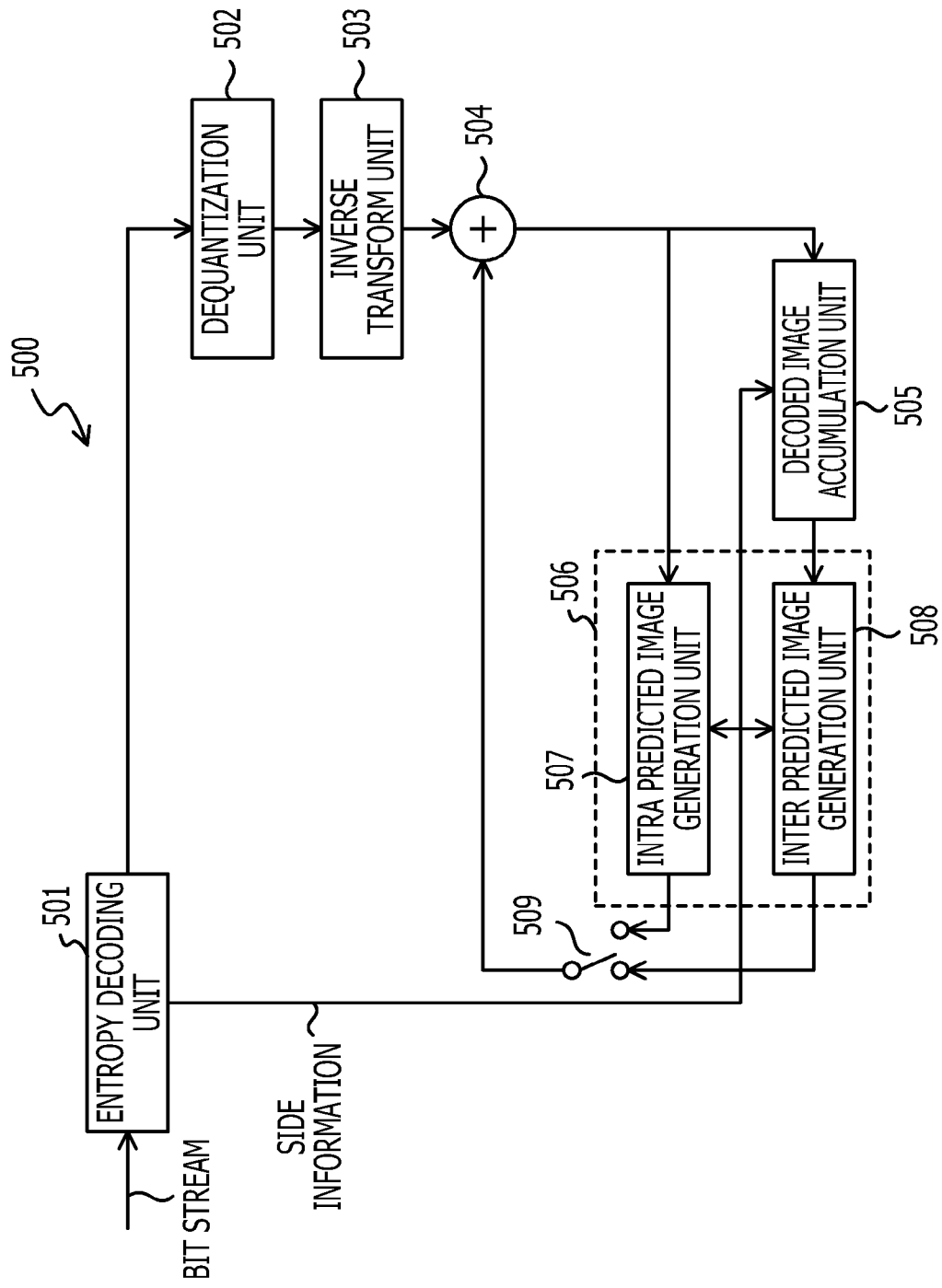

VIDEO ENCODING APPARATUS AND VIDEO DECODING APPARATUS

CROSS-REFERENCE TO RELATED APPLICATION(S)

This application is based upon and claims the benefit of priority of the prior Japanese Patent Application No. 2011-243623, filed on Nov. 7, 2011, the entire contents of which are incorporated herein by reference.

FIELD

The embodiments discussed herein are related to a video encoding apparatus and a video decoding apparatus.

BACKGROUND

Video data having a large volume undergoes high-efficiency encoding before being transmitted from a transmitting device to a receiving device or being stored in a storage device. The term "high-efficiency encoding" refers to an encoding process for transforming a certain data string into another data string, for example, a process for compressing the amount of data. A high-efficiency video data encoding method includes an intra-picture (or intra) prediction encoding method and an inter-picture (or inter) prediction encoding method. In the intra prediction encoding method, video data having a high correlation in the spatial direction is utilized. For example, an image is encoded and decoded using only information concerning an image to be encoded. In the inter prediction encoding method, video data having a high correlation in the temporal direction is utilized. Video data is encoded by reference to a temporally close image with high similarity, for example, an image that has been encoded.

A related technique is disclosed in Organization for Standardization (ISO)/International Electrotechnical Commission (IEC) 13818, Generic coding of moving pictures and associated audio information, ISO/IEC 14496-10, MPEG-4 Part 10 Advanced Video Coding, or High Efficiency Video Coding (HEVC), which is a video coding scheme currently under joint development by the ISO/IEC and the International Telecommunication Union Telecommunication Standardization Sector (ITU-T).

SUMMARY

According to one aspect of the embodiments, a video encoding apparatus includes: a reference vector deriving unit to derive as a reference vector a vector used when encoding a block that is near a block to be encoded and is included in a region where a field picture to be encoded is subjected to encode; a scaling unit to scale the reference vector based on a temporal distance between the field picture to be encoded and a first encoded field picture specified by the reference vector and a temporal distance between the field picture to be encoded and a second encoded field picture specified by a reference index and referenced by the block to be encoded in the field picture to be encoded to generate a motion prediction vector; and a motion prediction vector correction unit to correct the motion prediction vector using a parity of the field picture to be encoded, a parity of the first encoded field picture, and a parity of the second encoded field picture to generate a corrected motion prediction vector.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 8A and 8B illustrate an exemplary different code depending on the number of candidates;
FIG. 9 illustrates an exemplary video decoding apparatus.

DESCRIPTION OF EMBODIMENTS

Figure 1:
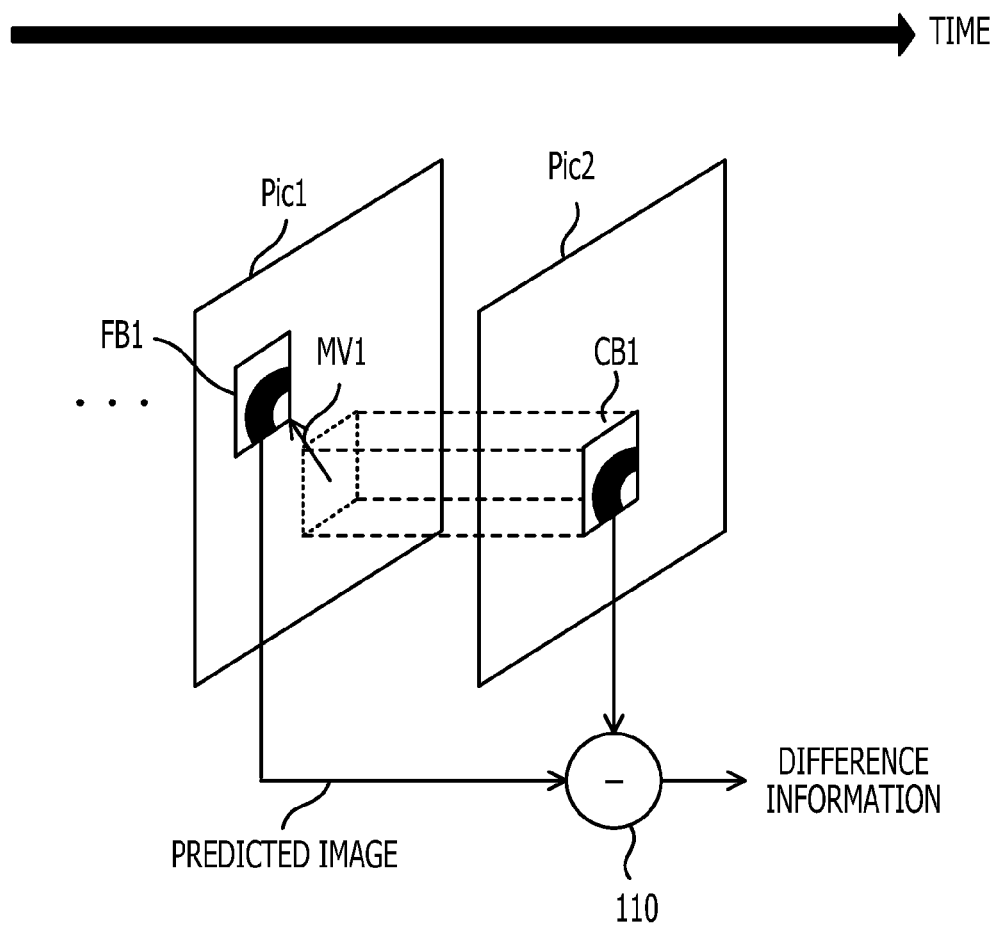
FIG. 1 illustrates an exemplary inter prediction scheme.

FIG. 1 illustrates an exemplary inter prediction scheme. A block to be encoded CB1, which is obtained by dividing a target image to be encoded Pic2 into blocks, is encoded by reference to a forward reference image Pic1 that has been encoded and has been decoded for reference. For example, a region of a forward reference block FB1 in the forward reference image Pic1, which is similar to the block to be encoded CB1, is selected, and the difference between the forward reference block FB1 and the block to be encoded CB1 is obtained by a prediction error generator 110 to remove redundancy. Forward motion vector information MV1 pointing the similar region and difference information from which redundancy has been removed are encoded, resulting in increased compression ratio.

For example, in a data transmission system using inter prediction encoding, a transmitting device transmits motion vector data indicating "motion" from the preceding image to the current image to be encoded and difference data between a predicted image created from the preceding image using the motion vector data and the current image to be encoded to a receiving device. The receiving device reproduces an image to be decoded from the received motion vector data and difference data.

In backward prediction, unlike forward prediction, a temporally later image is used as a reference image. In bi-directional prediction, results individually obtained by forward and backward processing are used.

The video coding scheme may include ISO/IEC MPEG-2/MPEG-4 (hereinafter referred to as MPEG-2, MPEG-4).

Figure 2:
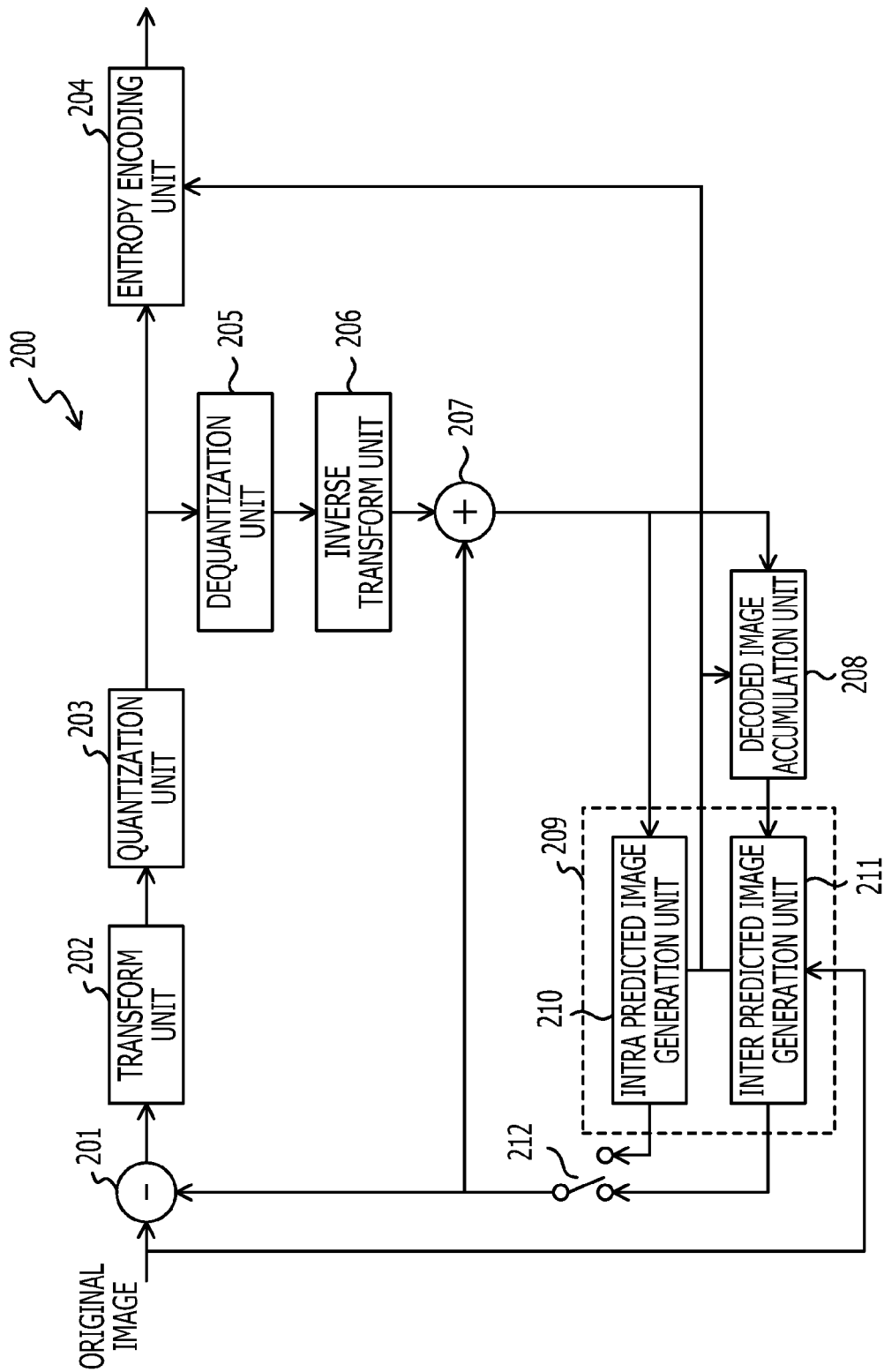
FIG. 2 illustrates an exemplary video encoding apparatus.

FIG. 2 illustrates an exemplary video encoding apparatus 200. The video encoding apparatus 200 includes a prediction error generation unit 201, a transform unit 202, a quantization unit 203, an entropy encoding unit 204, a dequantization unit 205, an inverse transform unit 206, a decoded image generation unit 207, a decoded image accumulation unit 208, a to-be-encoded-block predicted image generation unit 209, and a predicted image selection unit 212.

The prediction error generation unit 201 generates a prediction error based on block data of input original image data which is divided into blocks having a predetermined size and based on block data (prediction signal) of a predicted image supplied from the to-be-encoded-block predicted image generation unit 209. The prediction error generation unit 201 supplies the generated prediction error to the transform unit 202.

The transform unit 202 performs a transform process on the prediction error. The transform unit 202 supplies the prediction error which has been separated into horizontal and vertical frequency components by the transform process to the quantization unit 203. The quantization unit 203 quantizes the output of the transform unit 202. The quantization unit 203 reduces the amount of code for the prediction error, and supplies the prediction error to the entropy encoding unit 204 and the dequantization unit 205.

The entropy encoding unit 204 applies entropy encoding (such as variable length encoding or arithmetic encoding) to the output of the quantization unit 203 and side information including encoding parameters used for encoding, such as motion vectors, and outputs the results. In entropy encoding, a variable length code is assigned in accordance with the frequency of occurrence of a symbol.

The dequantization unit 205 dequantizes the output of the quantization unit 203, and supplies the result to the inverse transform unit 206. The inverse transform unit 206 inversely transforms the output of the dequantization unit 205, and supplies the result to the decoded image generation unit 207. Through the decoding process performed by the dequantization unit 205 and the inverse transform unit 206, a prediction error substantially equal to the prediction error prior to encoding is obtained.

The decoded image generation unit 207 adds together the block data of the predicted image generated by the to-be-encoded-block predicted image generation unit 209 and the reproduced prediction error decoded by the dequantization unit 205 and the inverse transform unit 206 to reproduce the data of the encoded image block of the encoded original image data block, and passes the reproduced data to the decoded image accumulation unit 208.

The decoded image accumulation unit 208 stores the decoded block data as data of a new reference image, and also stores the side information representing encoding parameters including motion vectors for encoding. The stored decoded image data is supplied to the to-be-encoded-block predicted image generation unit 209.

The to-be-encoded-block predicted image generation unit 209 includes an intra predicted image generation unit 210 and an inter predicted image generation unit 211. The to-be-encoded-block predicted image generation unit 209 generates block data of a predicted image corresponding to the image to be encoded, and supplies the side information representing encoding parameters including motion vectors for encoding to the entropy encoding unit 204 and the decoded image accumulation unit 208.

The intra predicted image generation unit 210 generates block data of a predicted image based on intra encoding (or intra-frame encoding). The inter predicted image generation unit 211 obtains motion vectors using the block data in the original image data to be encoded and using the block data of an already decoded image which is obtained from the decoded image accumulation unit 208. A motion vector is a value indicating a block-by-block spatial shift which may be determined using a block matching technique for searching for a position that is the most similar to the original image from a reference image on a block-by-block basis. The inter predicted image generation unit 211 performs motion compensation on the image data obtained from the decoded image accumulation unit 208 with the motion vectors to generate block data of a predicted image.

The block data of a predicted image generated in either the intra predicted image generation unit 210 or the inter predicted image generation unit 211 in the to-be-encoded-block predicted image generation unit 209 is supplied to the prediction error generation unit 201 and the decoded image generation unit 207 through the predicted image selection unit 212.

Figure 3:
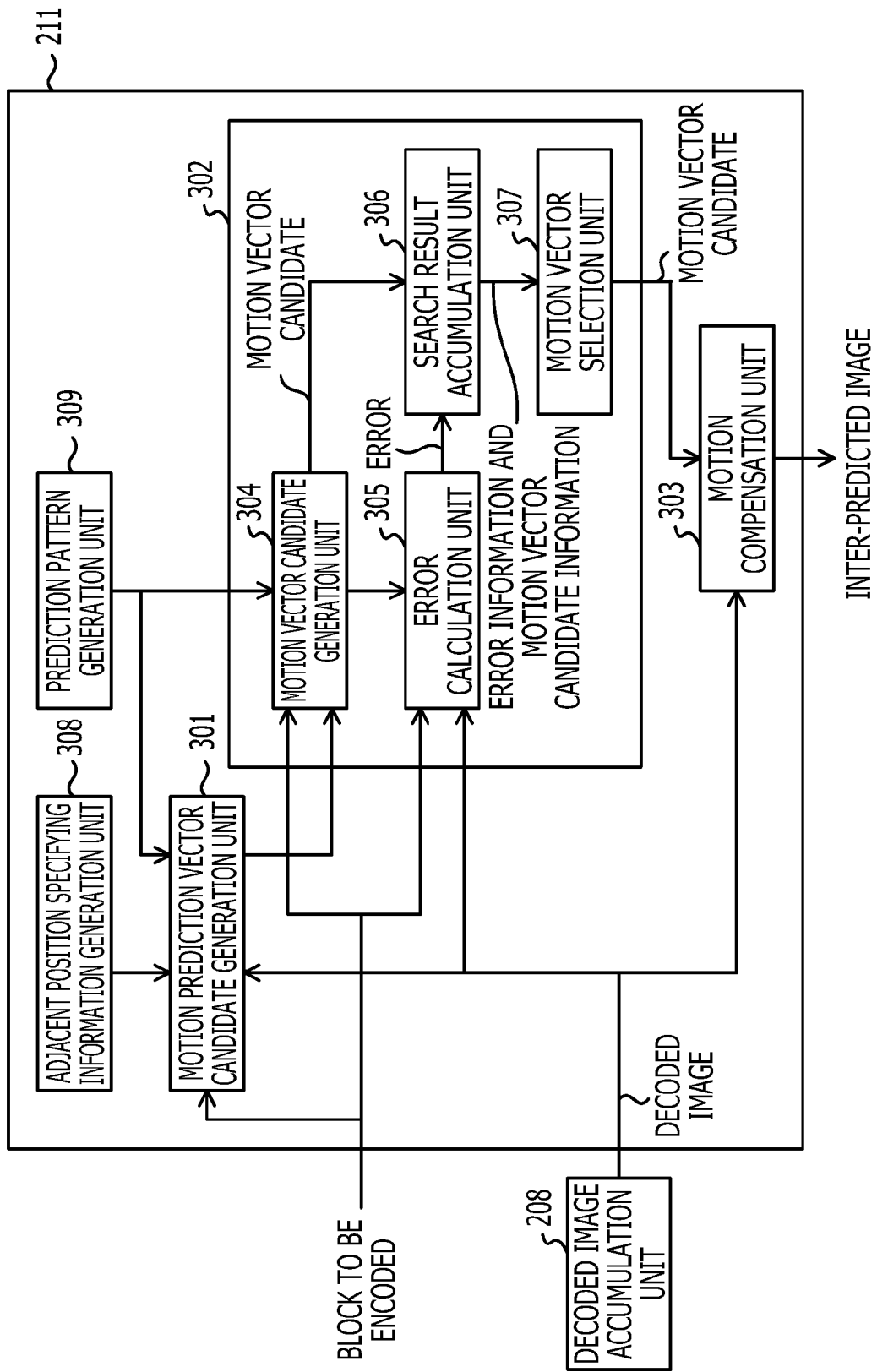
FIG. 3 illustrates an exemplary inter predicted image generation unit.

FIG. 3 illustrates an exemplary inter predicted image generation unit. The inter predicted image generation unit 211 includes an adjacent position specifying information generation unit 308, a prediction pattern generation unit 309, a motion prediction vector candidate generation unit 301, a motion search unit 302, and a motion compensation unit 303. The inter predicted image generation unit 211 receives, as input, block data to be encoded, the decoded image stored in the decoded image accumulation unit 208, and side information representing encoding parameters including motion vectors for encoding, and outputs an inter predicted image.

The motion search unit 302 includes a motion vector candidate generation unit 304, an error calculation unit 305, a search result accumulation unit 306, and a motion vector selection unit 307.

The block data to be encoded may include pixel values, a display time (or picture order count (POC)) of the image, and encoding parameter information such as the position of the block to be encoded or the size of the block to be encoded.

The decoded image may include pixel values of the decoded image, a display time (or POC) of the image, and side information that is encoding parameter information including motion vectors used when the image is encoded, such as block division depth (e.g., block size) or a prediction mode (intra/inter).

The adjacent position specifying information generation unit 308 transmits, to the motion prediction vector candidate generation unit 301, adjacent position specifying information specifying, by index, an adjacent block from which a motion vector, which has been used when encoding a block and is to be used as a motion prediction vector, is obtained. Here, the positions of adjacent blocks are determined in advance in accordance with the position of the block to be encoded, without any special input (e.g., a standard).

The prediction pattern generation unit 309 transmits, to the motion prediction vector candidate generation unit 301, prediction information specifying which list to be used from a plurality of lists of encoded pictures for motion prediction, and a reference index specifying which picture to be used in the list. In the video encoding apparatus 200, a search for the best motion vector is performed using a combination of a plurality of pieces of prediction information and reference indices. Such combination may be set in advance by a user who performs an encoding operation, or may be changed in accordance with encoding conditions. For example, a determined condition (a combination of prediction information and a reference index) may be supplied to the motion prediction vector candidate generation unit 301.

The motion prediction vector candidate generation unit 301 receives the block to be encoded, the encoding parameters specified by the adjacent position specifying information generation unit 308 and the prediction pattern generation unit 309, and the decoded image, and derives the candidates of the motion prediction vector which has been used when encoding a plurality of blocks temporally and spatially adjacent to the block to be encoded and which may be used as vectors for predicting a motion vector of the block to be encoded.

The motion vector candidate generation unit 304 receives the block to be encoded, the candidates of the motion prediction vector, and the prediction information, and generates the candidates of a motion vector, which may be used for motion search, from the block to be encoded in the image to be encoded to a reference block in the decoded image supplied from the decoded image accumulation unit 208 outside the inter predicted image generation unit 211.

The error calculation unit 305 receives the block to be encoded, the decoded image, and the candidates of the motion vector, and calculates an error between the block to be encoded and a reference block in the decoded image which is specified using each of the candidates of the motion vector.

The search result accumulation unit 306 receives the candidates of the motion vector and the errors, and accumulates error information, which is supplied from the error calculation unit 305, and motion vector candidate information associated with the error information.

The motion vector selection unit 307 receives the candidates of the motion vector and the errors associated with the candidates of the motion vector, and selects a motion vector candidate associated with the smallest error in the error information supplied from the search result accumulation unit 306. The motion vector selection unit 307 outputs the motion vector candidate.

The motion compensation unit 303 receives the motion vector candidate and the decoded image, and selects a reference block in the decoded image in accordance with the motion vector candidate supplied from the motion vector selection unit 307. Then, the motion compensation unit 303 outputs the selected reference block as inter predicted image.

Figure 4:
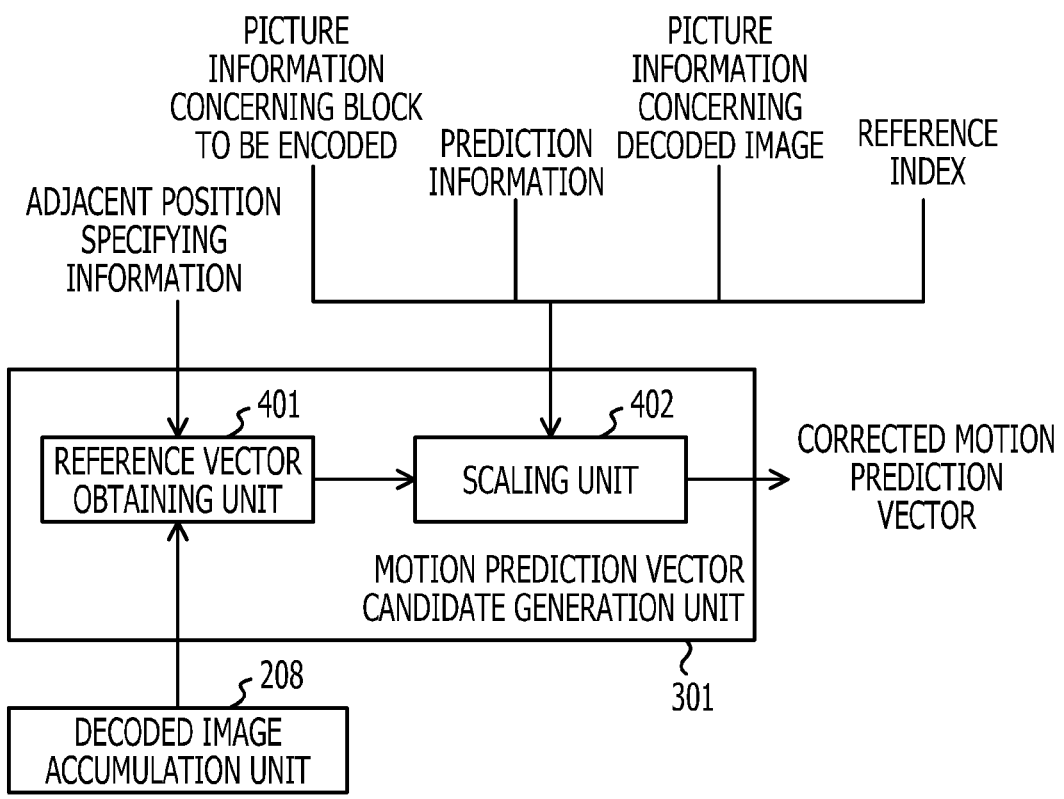
FIG. 4 illustrates an exemplary motion prediction vector candidate generation unit.

FIG. 4 illustrates an exemplary motion prediction vector candidate generation unit.

The motion prediction vector candidate generation unit 301 includes a reference vector obtaining unit 401 and a scaling unit 402. The motion prediction vector candidate generation unit 301 receives adjacent position specifying information, picture information concerning the block to be encoded, prediction information, picture information concerning the decoded image, a reference index, and a motion vector of an adjacent block from a motion vector storage unit, and outputs motion prediction vector candidates. The above input items may be information included in the decoded image in the inter predicted image generation unit 211 illustrated in FIG. 3, the block to be encoded, and setting data from the adjacent position specifying information generation unit 308 and the prediction pattern generation unit 309.

The reference vector obtaining unit 401 derives a motion vector at an adjacent position, which serves as a reference vector, based on the motion vector supplied from the decoded image accumulation unit 208 and the adjacent position specifying information in accordance with the position of the block to be encoded. The scaling unit 402 applies scaling to the reference vector with respect to the picture information concerning the block to be encoded and the picture information concerning the decoded image selected by the reference index and the prediction information, and outputs a motion prediction vector.

In the video encoding apparatus 200, individual blocks are encoded from the upper left to the lower right of an image in the order of a raster scan or z-scan. Thus, a motion vector of a neighboring block, which can be utilized for the prediction of a motion vector in the video encoding apparatus 200, may be a motion vector of the left or upper adjacent block that has already been encoded when encoding the block to be encoded. The block which can be utilized (or can be referred to) for the prediction of a motion vector when decoding the block to be decoded may also be the left or upper adjacent block whose motion vector has already been decoded.

A motion prediction vector may also be determined using a motion vector of a previously encoded or decoded image.

The motion prediction vector determination method may include high efficiency video coding (HEVC). A motion prediction vector may be determined using the high efficiency video coding test model (HM) software (version 4.0).

The HEVC scheme has lists of images that can be referred to (hereinafter referred to as reference image lists), for example, L0 and L1. In each block to be encoded, the reference image lists L0 and L1 and the individually associated motion vectors are used, and up to two regions in the reference image are used for inter prediction. The reference image lists L0 and L1 may correspond to the display time directions. The reference image list L0 is a reference image list for images preceding the image to be encoded, and the reference image list L1 is a reference image list for images following the image to be encoded. Each entry of the reference image lists includes a storage position of pixel data and display time information of the associated image, e.g., the picture order count (POC) value. POC is an integer value representing the order in which individual images are displayed and the relative display time. When the display time of an image having the POC value 0 is set to 0, the display time of a certain image is represented by a constant multiple of the POC value of the image. For example, if the display period (Hz) of each frame is denoted by fr and an image has a POC value p, the display time of the image is represented by formula (1). POC may be regarded as a display time in units of a constant (e.g., seconds).

$$p \cdot fr/2 \tag{1}$$

For example, if one reference image list has two or more entries, each motion vector defines which reference image is referred based on the index number (or reference index) in the reference image list. For example, if the number of entries in a reference image list is one (i.e., one image), the reference index of the motion vector corresponding to the list is automatically set to 0, and therefore the reference image may not be specified. The motion vector of the block includes an L0/L1 list identifier, a reference index, and vector data (Vx, Vy). A reference image is specified by the L0/L1 list identifier and the reference index, and a vector (Vx, Vy) pointing a region in the reference image is specified. Vx and Vy are differences between the horizontal coordinate of the reference region and the horizontal coordinate of the current block and between the vertical coordinate of the reference region and the vertical coordinate of the current block, respectively, and are each represented in units of ¼ pixels. The L0/L1 list identifier and the reference index may also be referred to as reference image identifiers, and (Vx, Vy) may be referred to as vector data.

A determination of a prediction vector in HEVC includes a merge mode and a motion vector prediction (MVP) mode.

A motion prediction vector is determined for each reference image specified by an L0/L1 list identifier and a reference index. If a reference image list is represented by LX and a reference index is represented by refIdx, when vector data mvp of a motion prediction vector with respect to a motion vector which specifies a reference image is determined, up to three pieces of vector data are calculated as motion prediction vector candidates.

Blocks adjacent to the block to be encoded in the spatial direction and the temporal direction are separated into blocks adjacent in the leftward direction, blocks adjacent in the upward direction, and blocks adjacent in the temporal direction. Up to one motion prediction vector candidate is selected from each of the three groups. The selected motion prediction vector candidates are listed in the priority order of: the left adjacent group, the upper adjacent group, and the temporally adjacent group. In the fourth high efficiency video coding test model (HM4), up to two candidates are enumerated as a prediction information candidate list from the three groups. The list is set as the sequence mvp_cand. If there are no motion prediction vector candidates in any of the groups, a zero vector is added to the sequence mvp_cand. A prediction vector candidate index mvp_idx is used as an identifier as to which candidate in the prediction information candidate list to use as a motion prediction vector. For example, mvp represents vector data of a motion prediction vector candidate entered in the (mvp_idx)-th place in the sequence mvp_cand.

In the video encoding apparatus 200, if a motion vector that refers to the reference index refIdx in the reference image list LX of the block to be encoded is my, the closest candidate to the motion vector my in the sequence mvp_cand is searched for, and its index is set as mvp_idx. A difference vector mvd is calculated using formula (2) below. The reference index refIdx, the difference vector mvd, and the index mvp_idx are encoded as motion vector information on the list LX, and are transmitted to a video decoding apparatus.

$$mvd = mv - mvp \quad (2)$$

The video decoding apparatus decodes the reference index refIdx, the difference vector mvd, and the index mvp_idx, determines the sequence mvp_cand based on the reference index refIdx, and sets the motion prediction vector mvp as the (mvp_idx)-th motion prediction vector candidate in the sequence mvp_cand. The motion vector my of the block being processed is recovered based on formula (3) as follows.

$$mv = mvd + mvp \quad (3)$$

Figure 5:
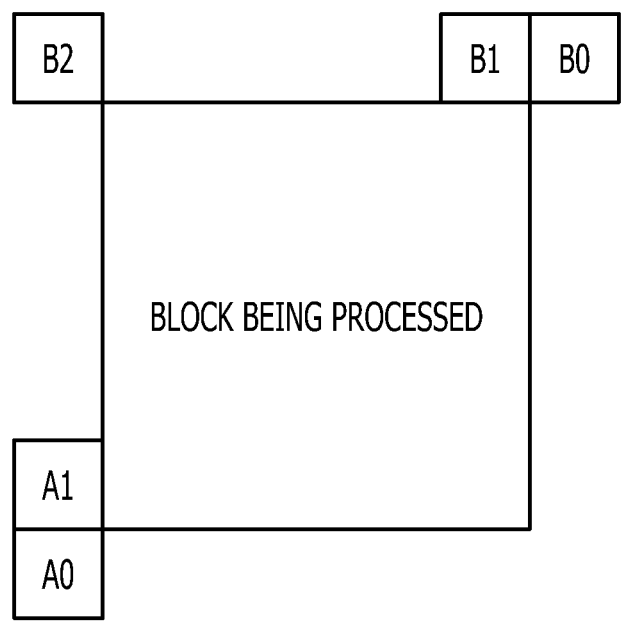
FIG. 5 illustrates an exemplary position of spatially adjacent blocks.

FIG. 5 illustrates an exemplary position of spatially adjacent blocks. In HEVC or H.264, the minimum block is set in advance for motion compensation, and all the block sizes are multiplied by a factor of 2 with respect to the minimum block size. If the minimum block sizes are denoted by MINX and MINY, the horizontal size and the vertical size of each block are represented by formulas (4) and (5) below, respectively, where n and m are integers satisfying n≥0 and m≥0.

$$MINX \cdot 2n \quad (4)$$

$$MINY \cdot 2m \quad (5)$$

In HEVC or H.264, for example, MINX may be four pixels and MINY may be four pixels. Each block is divided by the minimum block size. As illustrated in FIG. 5, A0, A1, and B0 to B2 may be minimum blocks adjacent to the block being processed. When a minimum block is specified, a block including the minimum block is uniquely set.

A motion prediction vector candidate may be selected from a left adjacent block. A motion vector of a block which is left adjacent to the block being processed and which includes the minimum block A0 located at the lower left position, the motion vector having a reference index whose reference image identifier is equal to that of the reference index refIdx in the list LX, is selected. If this motion vector is not searched for, a motion vector of the block which includes the minimum block A0, the motion vector referring to the same reference image as the reference image identified by the reference index refIdx in the reference list LX, is selected in a reference list LY different from the list LX. If this motion vector is not searched for, a motion vector of a block which includes the minimum block A1, the motion vector having a reference index equal to that of the reference index refIdx in the list LX, is selected. If this motion vector is not searched for, a motion vector of the block which includes the minimum block A1, the motion vector referring to the same reference image as the reference image identified by reference index refIdx in the reference list LX, is selected in the reference list LY different from the list LX. If this motion vector is not searched for, a motion vector of the block which includes the minimum block A0 is selected. If this motion vector is not searched for, a motion vector of the block which includes the minimum block A1 is selected. If a motion vector that refers to the same reference image as the reference image identified by the reference index refIdx of the reference list LX has not been selected, a scaling operation may be performed.

A motion prediction vector candidate may be selected from an upper adjacent block. A block including the minimum blocks B0 to B2 upward adjacent to the block to be encoded is subjected to a procedure similar to that for A0 to A1 to select a motion vector. If a motion vector that refers to the same reference image as the reference image identified by the reference index refIdx in the reference list LX has not been selected, a scaling operation may be performed.

A motion prediction vector candidate may be selected from a temporally adjacent block. A temporally adjacent reference image, called a collocated picture (hereinafter referred to as ColPic), is specified as an image including a temporally adjacent block. A reference image having the reference index 0 in either the reference image list L0 or L1 is set as ColPic. The reference image having the reference index 0 in the reference list L1 may be ColPic. A block adjacent to a motion prediction block in the ColPic may be a Col block.

Figure 6:
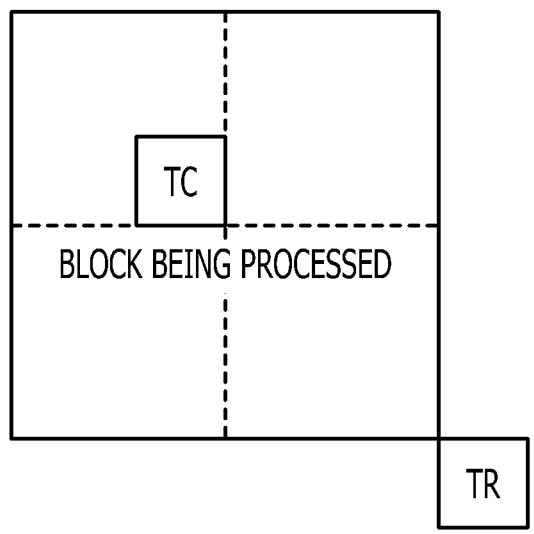
FIG. 6 illustrates an exemplary position of a Col block.

FIG. 6 illustrates an exemplary position of a Col block. In the ColPic, a block including a minimum block TR or TC is set as a Col block. Of the minimum blocks TR and TC, the minimum block TR may be prioritized. If a block including the minimum block TR is in an intra prediction mode or is out-of-picture, a block including the minimum block TC is set as a Col block.

A motion vector of a Col block is represented by mvCol, and the motion vector mvCol is scaled and output as a motion prediction vector candidate.

An input motion vector is defined as mv=(mvx, mvy), and an output vector is defined as mv'=(mvx', mvy'). An image to which the input motion vector my refers is defined as Col- RefPic. The POC value of an image having the input motion vector my is defined as ColPicPoc, and the POC value of the image ColRefPic is defined as ColRefPoc. In addition, the POC value of the current image to be encoded is defined as CurrPoc, the reference image list is defined as RefPicList LX, and the POC value of an image specified by the reference index RefIdx is defined as CurrRefPoc. If the motion vector to be scaled is a motion vector of a spatially adjacent block, ColPicPoc may be substantially equal to CurrPoc. If the motion vector to be scaled is a motion vector of a temporally adjacent block, ColPicPoc may be substantially equal to the POC value of the ColPic.

The input motion vector my is calculated using formulas (6) and (7) as below through scaling based on the time interval ratio of the image.

$$mvx'=mvx\cdot(CurrPoc-CurRefPoc)\div(ColPicPoc-ColRefPoc) \quad (6)$$

$$mvy'=mvx\cdot(CurrPoc-CurRefPoc)\div(ColPicPoc-ColRefPoc) \quad (7)$$

Since division uses a large amount of computation, the division may be approximated by multiplication and shifting, for example, as given in formulas (8) and (9) as follows.

$$DiffPocD=ColPicPOC-ColRefPOC; \quad (8)$$

$$DiffPocB=CurrPOC-CurrRefPOC; \quad (9)$$

TDB=Clip3(−128, 127, DiffPocB);
TDD=Clip3(−128, 127, DiffPocD);
iX=(0x4000+abs(TDD/2))/TDD;
Scale=Clip3(−1024, 1023, (TDB*iX+32)>>6);

Clip3(x, y, z) denotes the function that returns the median of x, y, and z. Scale may be a scaling factor. Scale=256 means a 1× factor. A scaling operation is performed using formulas (10) and (11) as follows.

$$mvx=(Scale\cdot mvx+128)>>8 \quad (10)$$

$$mvy=(Scale\cdot mvy+128)>>8 \quad (11)$$

In the above formulas, >> denotes the arithmetic right shift. A motion prediction vector candidate is generated.

The merge mode may be similar to the direct mode in H.264/MPEG-4 AVC. The number of motion prediction vector candidates in HEVC is larger than that in H.264/MPEG-4 AVC.

In the merge mode, a set owned by a block that is spatially or temporally close to the block being processed, the set including a prediction flag indicating whether each of the reference image lists L0 and L1 is valid or invalid, a reference index in each of the reference image lists L0 and L1, and prediction information on the individual motion vectors of the reference image lists L0 and L1, is used.

The prediction flag indicating that the reference image list L0 is valid and the reference image list L1 is invalid may mean one prediction with L0. The prediction flag indicating that the reference image list L0 is invalid and the reference image list L1 is valid may mean one prediction with L1. The prediction flag indicating that the reference image lists L0 and L1 are valid may mean both prediction. The prediction flag indicating that the reference image lists L0 and L1 are invalid may mean an intra-prediction block. The reference image identifier being an index outside the reference image list, without using a prediction flag, may mean being invalid. The reference image identifier being an index within the reference image list may mean being valid.

A prediction information candidate list is generated, and which prediction information to use may be specified by an index in the candidate list. If the block being processed is to be subjected to motion compensation using the same prediction information as neighboring blocks, the prediction information to be used for the block being processed is transmitted to the decoding apparatus by encoding an index in the list without encoding any motion vectors, and therefore the amount of code may be reduced. Whether the merge mode is enabled or not is indicated by a merge flag, and an index in the prediction information candidate list is indicated by a merge index.

Figure 7:
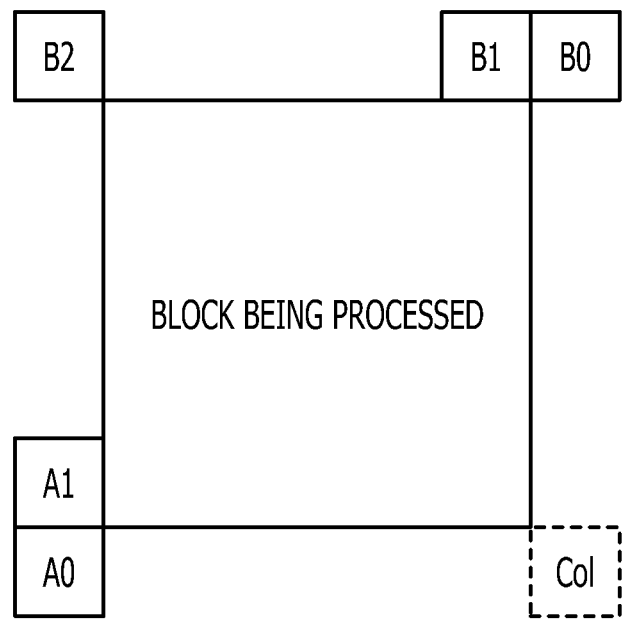
FIG. 7 illustrates an exemplary position of adjacent blocks in a merge mode.

FIG. 7 illustrates an exemplary position of adjacent block in a merge mode. In FIG. 7, the positional relationships between the block being processed and neighboring blocks are illustrated. A0, A1, B0, B1, and B2 denote blocks included in the same image as the block being processed, and are spatially adjacent. Col denotes a block included in an image that has been processed prior to the processing of the current image, and a temporally adjacent block. In HM4, up to five candidates are enumerated as a prediction information candidate list from six neighboring blocks. Prediction information for which an adjacent block is an intra-prediction block is not included in the prediction information candidate list. If there are a plurality of pieces of prediction information in which all the reference image identifiers, motion vector information, and the like match, the redundant pieces of prediction information are deleted because of redundancy.

FIGS. 8A and 8B illustrate an exemplary different code depending on a number of candidates. For example, as illustrated in FIGS. 8A and 8B, if the number of data candidates after encoding is changed by deleting redundant candidates, the method of assigning the code of data after encoding to an index may be changed.

If an error occurs in an image due to destruction of data or the like and a vector value is not correctly decoded, the image is set as a Col image, and a block temporally adjacent to a block in the image is referred to; however, the vector value for the temporally adjacent block may not be correctly decoded, resulting in a mismatch between the encoder and the decoder due to the deletion of redundant candidates. There may be inconsistency in the number of candidates.

If an image with an error is set as a Col image, in such an image, all the pieces of data, which includes from blocks for which an index has not been correctly decoded due to the inconsistency in the number of candidates to the vectors, may not be decoded. Thus, such an error may propagate. The number of candidates may be set to a fixed value, or may be derived using encoding information on the image.

If the prediction information candidate list has candidates less than a predetermined value, when codes are assigned using as a maximum value the predetermined value, rather than the number of effective candidates in the list, a code may be assigned to an index not to be used, resulting in uselessness. Thus, encoding efficiency may be reduced.

In HM4, the number of candidates is set to a fixed value. Thus, if prediction information candidate list has candidates less than the predetermined value, the reference image identifiers may be shifted and a 0 vector may be added to fill up the prediction information candidate list.

FIG. 9 illustrates an exemplary video decoding apparatus. A bit stream including a compressed video sequence is input to the video decoding apparatus 500. The video decoding apparatus 500 includes an entropy decoding unit 501, a dequantization unit 502, an inverse transform unit 503, a decoded image generation unit 504, a decoded image accumulation unit 505, a to-be-decoded-block predicted image generation unit 506, and a selection unit 509. The to-be-decoded-block predicted image generation unit 506 includes an intra predicted image generation unit 507 and an inter predicted image generation unit 508.

The entropy decoding unit 501 receives the bit stream, applies entropy decoding (such as variable length decoding or arithmetic decoding), and outputs a quantization coefficient and side information representing encoding parameters used for encoding. In entropy decoding, entropy-encoded data to which a variable length code is assigned in accordance with the frequency of occurrence of a symbol is decoded.

The dequantization unit 502 dequantizes the quantization coefficient obtained by the entropy decoding unit 501, and outputs a reproduction frequency coefficient, for example, a frequency coefficient obtained by performing a discrete cosine transform or the like on an error. Since quantization has been performed at the encoding time, a quantization error may be included.

The inverse transform unit 503 performs an inverse discrete cosine transform on the reproduction frequency coefficient output from the dequantization unit 502, and outputs a reproduction prediction error image. Since a decoding process is performed by the dequantization unit 502 and the inverse transform unit 503, difference information substantially equal to that on a prediction error image before encoding is obtained.

The decoded image generation unit 504 adds together a to-be-decoded-block predicted image output from the to-be-decoded-block predicted image generation unit 506 and the reproduction prediction error image, and outputs a decoded image.

The decoded image accumulation unit 505 accumulates the decoded image output from the decoded image generation unit 504 and the side information representing encoding parameters for the decoded image, and outputs the decoded image and the side information to the to-be-decoded-block predicted image generation unit 506.

The to-be-decoded-block predicted image generation unit 506 receives the decoded image and the side information, and generates a to-be-decoded-block predicted image which serves as a predicted value of a block to be decoded. Then, the to-be-decoded-block predicted image generation unit 506 outputs the to-be-decoded-block predicted image to the decoded image generation unit 504 through the selection unit 509.

In the to-be-decoded-block predicted image generation unit 506, the intra predicted image generation unit 507 performs intra prediction using only the pixel value information on the current decoded image and the side information to generate a to-be-decoded-block predicted image. The inter predicted image generation unit 508 receives one or more decoded images and the side information, and performs inter prediction to generate a to-be-decoded-block predicted image.

Figure 10:
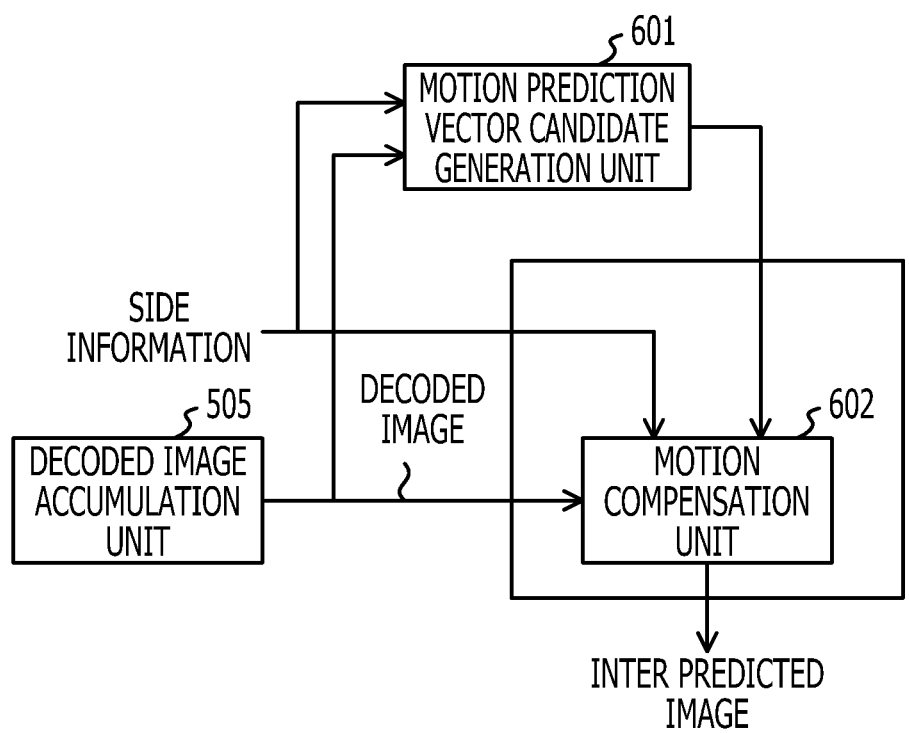
FIG. 10 illustrates an exemplary inter predicted image generation unit.

FIG. 10 illustrates an exemplary inter predicted image generation unit 508. The inter predicted image generation unit 508 includes a motion compensation unit 602. The inter predicted image generation unit 508 receives, as input, the decoded image and the side information output from the decoded image accumulation unit 505, and outputs an inter predicted image. The side information includes information such as a display time (or POC) of the image, the position of the block to be decoded, the size of the block to be decoded, or the motion vector selected when the block is encoded. The decoded image includes encoding parameter information obtained when the image is encoded, such as the pixel values of the decoded image, the display time (or POC) or block division depth (block size) of the image, or the prediction mode (intra/inter).

A motion prediction vector candidate generation unit 601 receives the side information representing encoding parameters including a motion vector for encoding, and the decoded image output from the decoded image accumulation unit 505, and outputs a motion prediction vector candidate.

The motion compensation unit 602 receives the decoded image, the side information representing encoding parameters including a motion vector for encoding, and the motion prediction vector candidate, and outputs an inter predicted image.

In the encoding of field pictures in the merge mode or the MVP mode, if mismatch occurs in parity among three field pictures, for example, the encoded field picture which a block to be encoded of an field picture to be encoded specified by the reference index refers, and an encoded field picture specified by the vector used when a specific block included in a region that has been encoded of the field picture to be encoded is encoded, an error corresponding to the mismatch may occur in the vector. This may result in the motion prediction vector being incorrect, and the encoding efficiency may be reduced.

Figure 11:
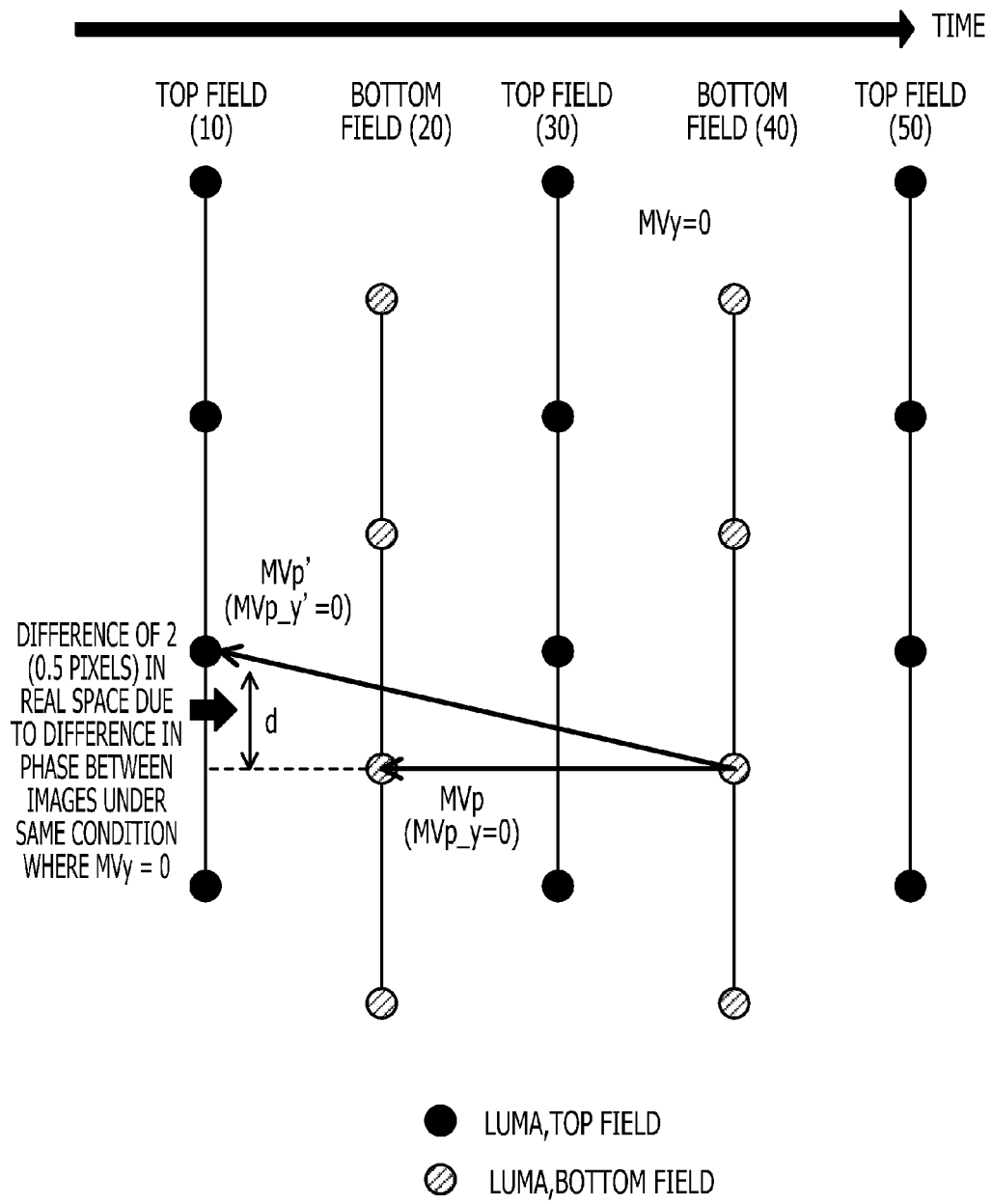
FIG. 11 illustrates an exemplary vector error.

FIG. 11 illustrates an exemplary vector error.

Pictures having a field structure are input in the temporal direction in the order of, for example, Top Field (10), Bottom Field (20), Top Field (30), Bottom Field (40), and Top Field (50). The Bottom Field pixels may be shifted downward with respect to the Top Field pixels by 0.5 pixels per field.

For example, the field picture to be encoded is the Bottom Field (40), the parity of the encoded field picture specified by the vector used when a specific block included in a region that has been encoded of the field picture to be encoded is encoded is on the Top Field (10), and the encoded field picture which a block to be encoded of an field picture to be encoded specified by the reference index refers is the Bottom Field (20). In addition, the vector used when a specific block included in a region that has been encoded of the field picture to be encoded is encoded is given by $MVp\_y'=0$. In this case, if a motion prediction vector is represented by $MVp\_y$, the vector $MVp\_y$ may not be parallel to the vector $MVp\_y'$ even though the vector $MVp\_y$ satisfies the same condition, i.e., $MVp\_y=0$, and a motion vector error d illustrated in FIG. 11 (an error of 0.5 pixels) may occur. In the real space, a vector is specified with an accuracy of ¼ pixels. Thus, a difference of 2 (i.e., 0.5 pixels) may occur.

Figure 12:
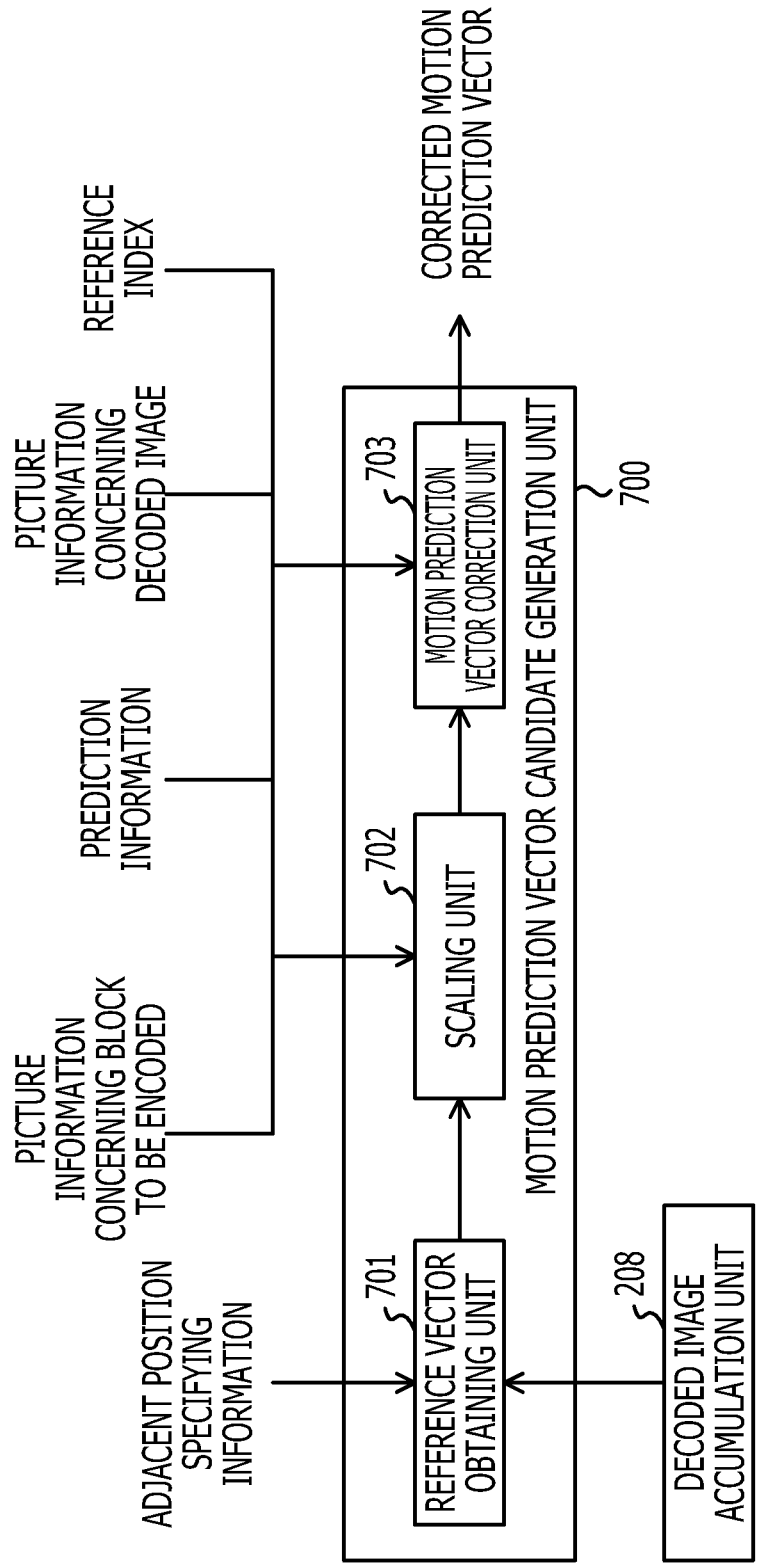
FIG. 12 illustrates an exemplary motion prediction vector candidate generation unit.

FIG. 12 illustrates an exemplary motion prediction vector candidate generation unit. For example, the accuracy of the motion vector may be ¼ pixels, and the motion vector for one pixel may be 4.

The motion prediction vector candidate generation unit 700 receives picture information concerning the block to be encoded, picture information concerning the decoded image, prediction information, a motion vector of an adjacent block output from the decoded image accumulation unit 208, adjacent position specifying information, or a reference index for specifying an encoded picture which is pointed by the motion vector of the block to be encoded, and outputs a corrected motion prediction vector. The motion prediction vector candidate generation unit 700 includes a reference vector obtaining unit 701, a scaling unit 702, and a motion prediction vector correction unit 703.

The decoded image accumulation unit 208 accumulates side information used when the decoded image is encoded, such as a motion vector.

The reference vector obtaining unit 701 receives adjacent position specifying information, picture information concerning the block to be encoded, or a motion vector from the decoded image accumulation unit 208, and outputs, as a reference vector, motion vector information concerning the block at the position specified by the adjacent position specifying information.

The scaling unit 702 receives the reference vector, picture information concerning the block to be encoded, picture information concerning the decoded image, prediction information, or a reference index, and applies scaling to the reference vector based on the POC of the block to be encoded, the POC of a first decoded image pointed by the reference vector, and the POC of a second decoded image specified by the reference index. Then, the scaling unit 702 outputs a motion prediction vector.

The motion prediction vector correction unit 703 receives as input the motion prediction vector output from the scaling unit 702, the picture information concerning the block to be encoded, the picture information concerning the decoded image, the prediction information, and the reference index, and corrects the motion prediction vector by referring to the parity of the block to be encoded, the parity of the first decoded image pointed by the reference vector, and the parity of a second decoded image specified by the reference index. Then, the motion prediction vector correction unit 703 outputs the corrected motion prediction vector.

Figure 13:
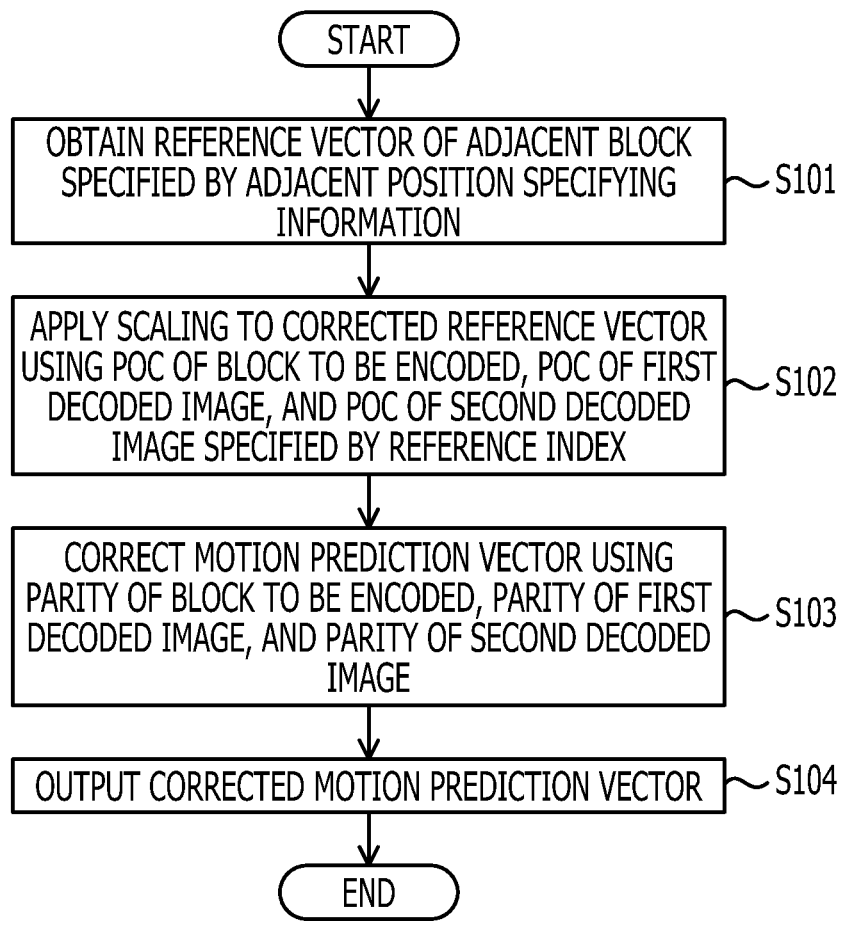
FIG. 13 illustrates an exemplary motion prediction vector candidate generation process.
Figure 14:
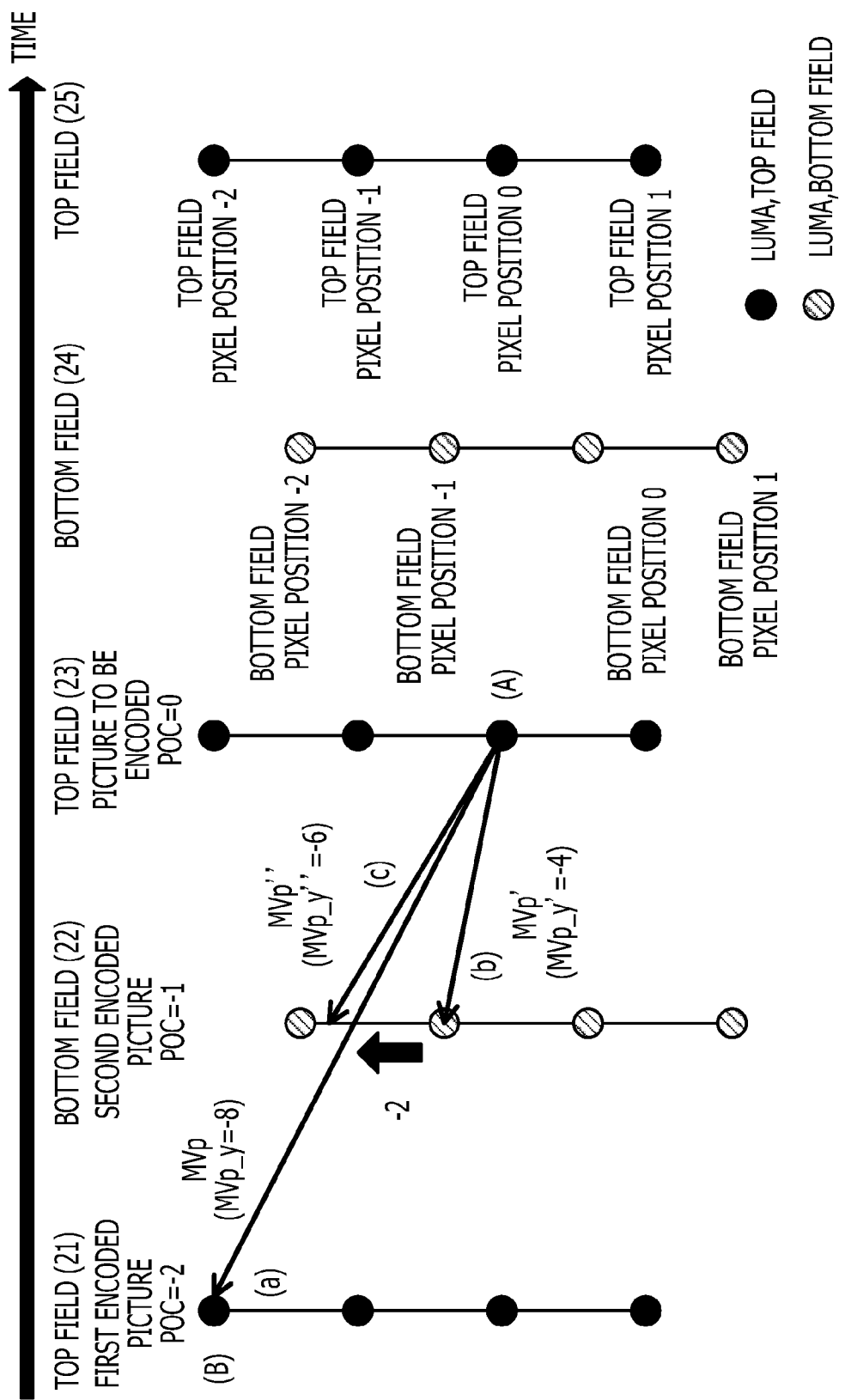
FIG. 14 illustrates an exemplary correction of a motion prediction vector.

FIG. 13 illustrates an exemplary motion prediction vector candidate generation process. FIG. 14 illustrates an exemplary correction of a motion prediction vector.

In operation (S101), a motion vector MVp=(MVp_x, MVp_y) of a block spatially adjacent to the block to be encoded is obtained from position information concerning the block to be encoded and adjacent position specifying information specifying the position of an adjacent encoded block, and is output as a reference vector.

The adjacent position to be specified is one of two positions in the MVP mode, for example, left and upper positions. In the merge mode, the adjacent position to be specified is one of four candidates, for example, left, upper, upper right, and lower left positions, or one of up to five positions, for example, left, upper, upper right, lower left, and upper left positions, if a motion prediction vector is not successfully obtained for at least one of the four candidates. In FIG. 14, the pixel position −2, which is indicated by (B), in the Top Field (21) is specified by the pixel position 0, which is indicated by (A), in the Top Field (23). Thus, MVp_y=−8. As a result, a vector indicated by (A) illustrated in FIG. 14 is obtained. A vector is specified with an accuracy of, for example, ¼ pixels, and thus one pixel may be handled as 4. Since a parity error occurs in the y direction, vectors in the y direction may be used.

In operation (S102), scaling is applied to the reference vector MVp using the input of picture information concerning the block to be encoded, picture information concerning the decoded image, prediction information, or a reference index, and a motion prediction vector MVp' is output. If the POC value of the field picture to be encoded including the block to be encoded is represented by POC_curr, the POC value of a first decoded image pointed by the reference vector is represented by POC_ref1, and the POC value of a second decoded image specified by the reference index is represented by POC_ref2, scaling is represented by formula (12).

$$MVp\_y'=MVp\_y*(POC\_ref2-POC\_curr)/(POC\_ref1-POC\_curr) \quad (12)$$

In the above formula, MVp_y' may be a motion prediction vector. In FIG. 14, formula (13) is used.

$$MVp\_y'=-8*(-1-0)/(-2-0)=-4 \quad (13)$$

The motion prediction vector MVp_y'=−4, for example, a motion prediction vector for one pixel, may correspond to a vector indicated by (b) illustrated in FIG. 14 in the Bottom Field (22). Since the reference vector has not been correctly scaled to the vector indicated by (b) illustrated in FIG. 14, such a vector may be corrected.

In operation (S103), a motion prediction vector MVp" is corrected using the input of picture information concerning the block to be encoded, picture information concerning the decoded image, prediction information, or a reference index by taking into account the parity of the field picture to be encoded and the parity of the field picture in the second decoded image specified by the reference index.

Formula (14) may be used.

$$MVp\_y''=MVp\_y'+2*(isBottomFieldRef1-isBottomFieldCurr)*(ref2\_poc-Curr\_poc)/(ref1\_poc-Curr\_poc)+2*(-isBottomFieldCurr-isBottomFieldRef2) \quad (14)$$

In FIG. 14, formula (15) below is used.

$$MVp\_y''=-4+2*(0-0)*(-1-0)/(-2-0)+2*(0-1)=6 \quad (15)$$

The corrected motion vector MVp_y" is −6, and may correspond to the vector indicated by (c) illustrated in FIG. 14. The vector indicated by (c) illustrated in FIG. 14 may be a vector that is parallel to the reference vector and may be a vector obtained by correct scaling.

The motion prediction vector MVp", to which the reference vector MVp has been correctly scaled, is obtained.

In operation (S104), a correct motion prediction vector is output.

The parity of the reference destination of the reference vector and the reference source of the reference vector may be Top Field to Top Field, and the parity of the reference destination of the prediction vector and the reference source of the prediction vector may be Top Field to Bottom Field.

Scaling the reference vector MVp_y yields MVp_y=−4 (one pixel), which corresponds to (b) illustrated in FIG. 14 in the Bottom Field (22). Through a correction of −2 (½ pixel), a correct vector indicated by (c) illustrated in FIG. 14 is obtained for the Top Field (23).

An adjacent position to be referred to and specified may be the one in the MVP mode or the merge mode. A block near the block to be encoded may be used for prediction.

Figure 15:
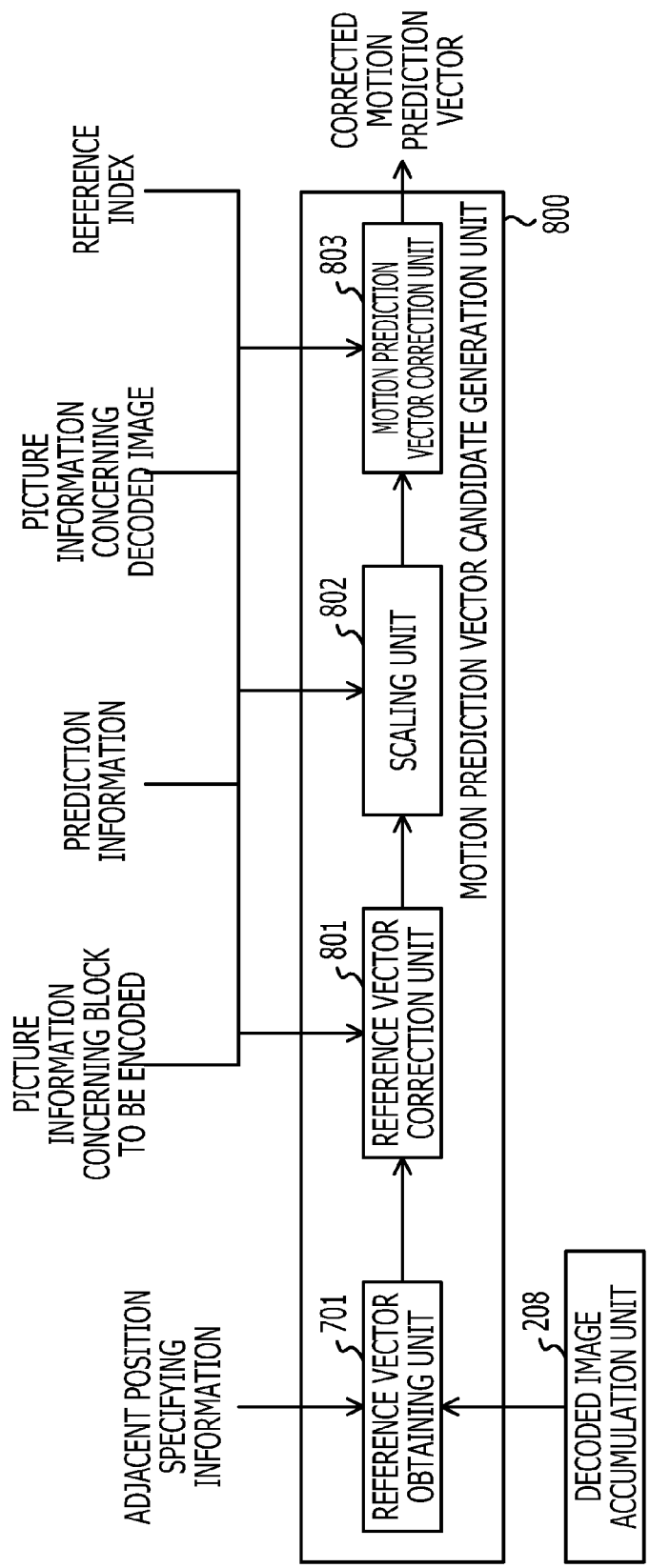
FIG. 15 illustrates an exemplary motion prediction vector candidate generation unit.

FIG. 15 illustrates an exemplary motion prediction vector candidate generation unit. The accuracy of the motion vector may be ¼ pixels, and the motion vector for one pixel may be 4.

The motion prediction vector candidate generation unit 800 receives picture information concerning the block to be encoded, picture information concerning the decoded image, prediction information, a motion vector of an adjacent block output from the decoded image accumulation unit 208, adjacent position specifying information, or a reference index for specifying a decoded image pointed by a motion vector of the block to be encoded, and outputs a corrected motion prediction vector. The motion prediction vector candidate generation unit 800 includes a reference vector obtaining unit 701, a reference vector correction unit 801, a scaling unit 802, and a motion prediction vector correction unit 803.

The decoded image accumulation unit 208 accumulates the motion vector used when a decoded picture is encoded.

The reference vector obtaining unit 701 receives the adjacent position specifying information, the picture information concerning the block to be encoded, or the motion vector output from the decoded image accumulation unit 208, and outputs, as a reference vector, motion vector information concerning the block at the position specified by the adjacent position specifying information.

The reference vector correction unit 801 receives the picture information concerning the block to be encoded, the picture information concerning the decoded image, the prediction information, or the reference vector, and corrects the reference vector using the parity of the picture to be encoded and the parity of the picture in a first decoded image pointed by the reference vector. Then, the reference vector correction unit 801 outputs the corrected reference vector.

The scaling unit 802 receives the corrected reference vector, the picture information concerning the block to be encoded, the picture information concerning the decoded image, the prediction information, or the reference index, and applies scaling to the corrected reference vector using the POC value of the picture to be encoded, the POC value of the picture in the first decoded image, and the POC value of a picture in a second decoded image specified by the reference index, and outputs a motion prediction vector.

The motion prediction vector correction unit 803 receives the motion prediction vector output from the scaling unit 802, the reference index, the picture information concerning the block to be encoded, the picture information concerning the decoded image, and the prediction information, and corrects the motion prediction vector by referring to the parity of the picture to be encoded and the parity of the picture in the second decoded image specified by the reference index, and outputs the corrected motion prediction vector.

Figure 16:
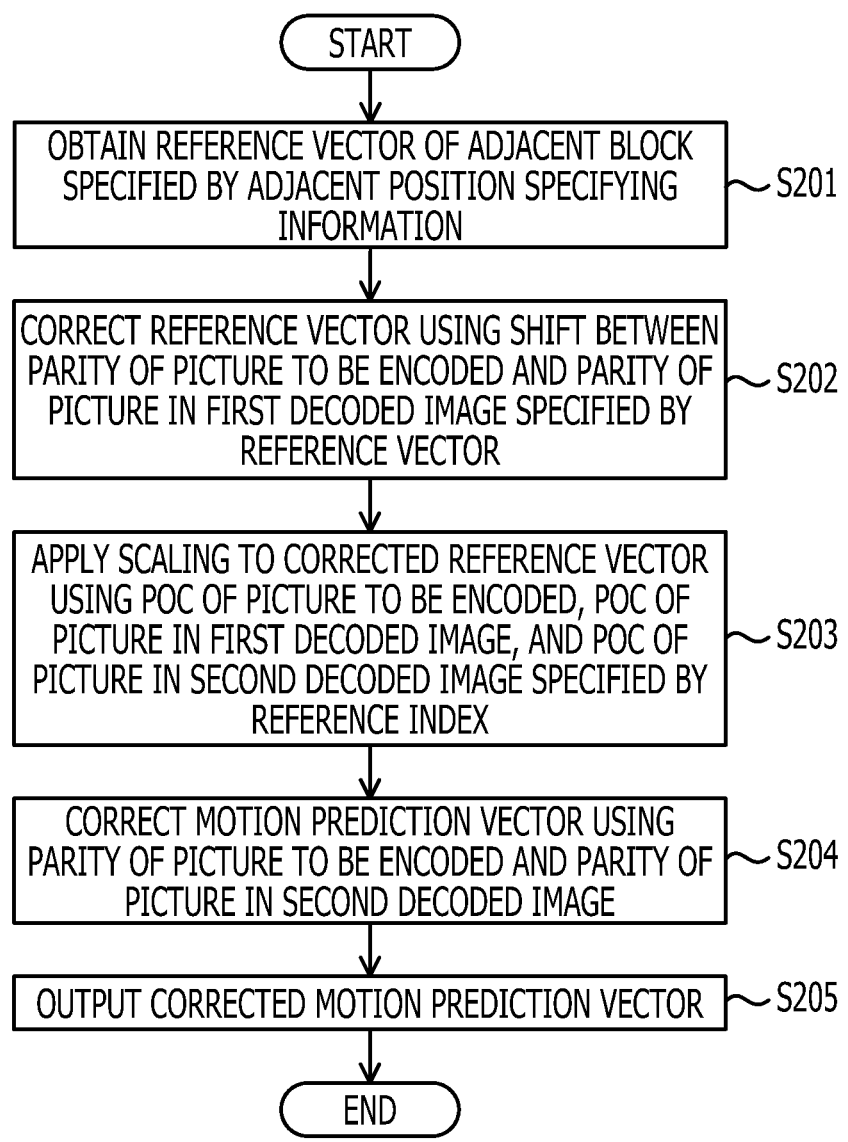
FIG. 16 illustrates an exemplary motion prediction vector candidate generation process.
Figure 17:
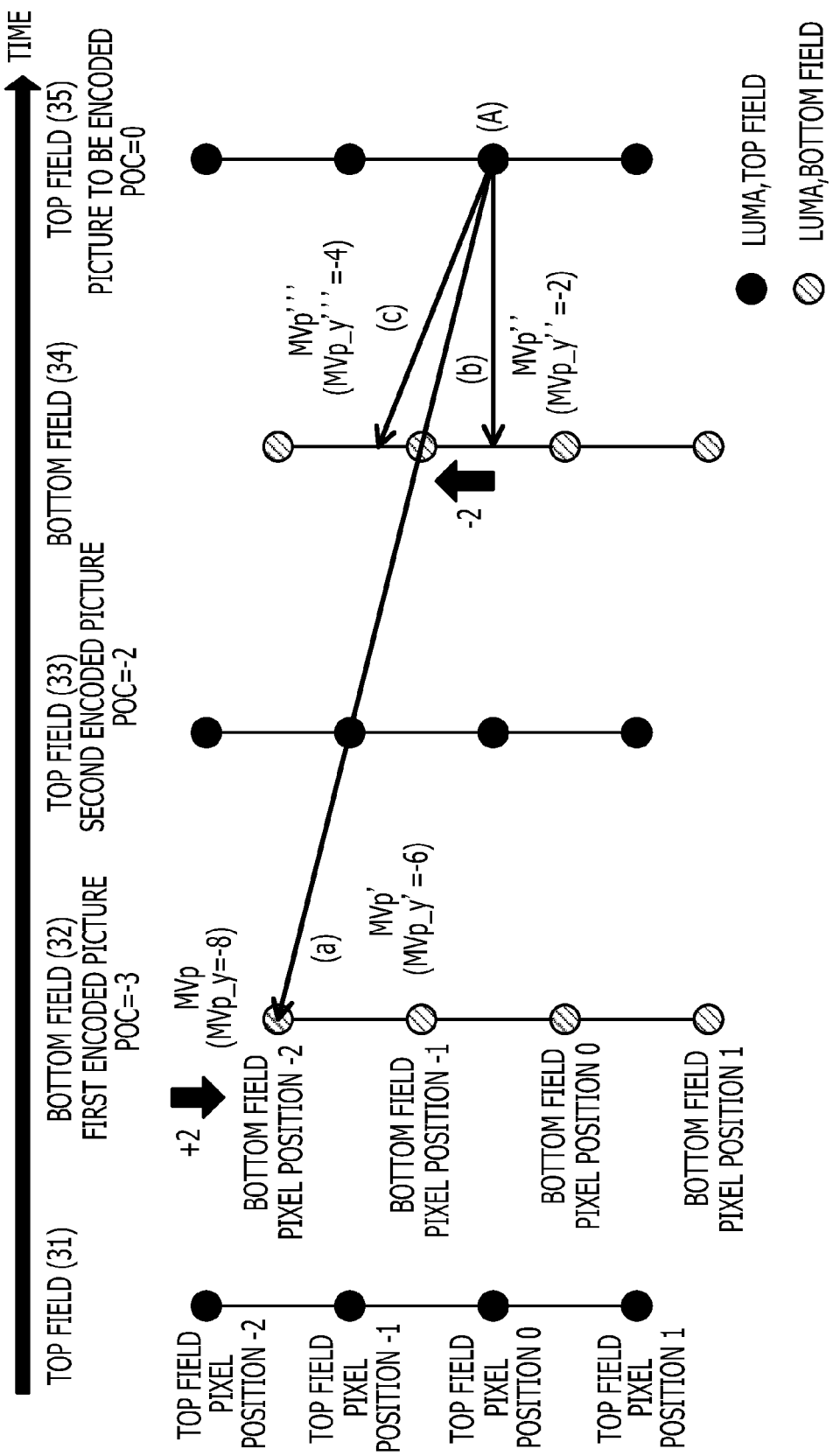
FIG. 17 illustrates an exemplary correction of a motion prediction vector.

FIG. 16 illustrates an exemplary motion prediction vector candidate generation process. FIG. 17 illustrates an exemplary correction of a motion prediction vector.

In operation (S201), a motion vector MVp=(MVp_x, MVp_y) of a block spatially adjacent to the block to be encoded is obtained from position information concerning the block to be encoded and adjacent position specifying information specifying the position of an adjacent encoded block, and is output as a reference vector.

The adjacent position to be specified is one of two positions in the MVP mode, for example, left and upper positions. In the merge mode, the adjacent position to be specified is one of four candidates, for example, left, upper, upper right, and lower left positions, or one of up to five positions, for example, left, upper, upper right, lower left, and upper left positions, if a motion prediction vector is not successfully obtained for at least one of the four candidates.

In FIG. 17, the pixel position −2 in the Bottom Field (32) is specified by the pixel position 0, which is indicated by (A), in the Top Field (35). Thus, MVp_y=−8. Since a parity error occurs in the y direction, vectors in the y direction may be used.

In operation (S202), the reference vector MVp is corrected using the input of picture information concerning the block to be encoded, picture information concerning the decoded image, prediction information, or a reference index by taking into account the parity of the picture to be encoded including the block to be encoded and the parity of a picture in a first decoded image pointed by the reference vector. Then, a corrected reference vector MVp' is output. Formula (16) may be used.

$$MVp\_y' = MVp\_y + 2(isBottomFieldref1 - isBottomFieldCurr) \quad (16)$$

In the above formula, MVp_y' may be a corrected reference vector. In FIG. 17, formula (17) may be used.

$$MVp\_y' = -8 + 2*(-1-0) = -6 \quad (17)$$

isBottomFieldCurr, which is represented by a vector indicated by (a) illustrated in FIG. 17, may be the parity of the picture to be encoded including the block to be encoded, and isBottomFieldRef may be the parity of a picture in a first decoded image pointed by the reference vector. isBottomFieldCurr and isBottomFieldRef may be set to 0 for the Top Field, and to 1 for the Bottom Field. In operation (S203), scaling is applied to the corrected reference vector MVp' using the input picture information concerning the block to be encoded, picture information concerning the decoded image, prediction information, or reference index, and a motion prediction vector MVp" is output. The POC value of the picture to be encoded including the block to be encoded may be represented by POC_curr, and the POC value of the picture in the first decoded image pointed by the reference vector may be represented by POC_ref1. In addition, the POC value of the picture in the second decoded image specified by the reference index may be represented by POC_ref2. Scaling is represented by formula (18).

$$MVp\_y'' = MVp\_y'*(POC\_ref2 - POC\_curr)/(POC\_ref1 - POC\_curr) \quad (18)$$

In the above formula, MVp_y" may be a motion prediction vector. In FIG. 17, formula (19) is used.

$$MVp\_y'' = -6*(-1-0)/(-3-0) = -2 \quad (19)$$

The motion prediction vector MVp_y"=−2, for example, may correspond to half a pixel, and may be a vector indicated by (b) illustrated in FIG. 17 in the Bottom Field.

In operation (S204), the motion prediction vector MVp_y" generated in operation (S203) may be corrected because it is desirable that the motion prediction vector MVp_y" be a vector to which the reference vector has been correctly scaled. The motion prediction vector MVp" is corrected using the input of picture information concerning the block to be encoded, picture information concerning the decoded image, prediction information, or a reference index by taking into account the parity of the picture to be encoded including the block to be encoded and the parity of the picture in the second decoded image specified by the reference index to generate a corrected motion prediction vector MVp'''. Formula (20) may be used.

$$MVp\_y''' = MVp\_y'' + 2*(-isBottomFieldCurr - isBottomFieldRef2) \quad (20)$$

In FIG. 17, formula (21) may be used.

$$MVp\_y''' = -2 + 2*(-0-1) = -4 \quad (21)$$

The corrected motion vector MVp_y''' may be −4, and may be a vector indicated by (c) illustrated in FIG. 17. The vector indicated by (c) illustrated in FIG. 17 may be a vector that is parallel to the reference vector and correspond to a correctly scaled vector.

The motion prediction vector MVp''' obtained by correctly scaling the reference vector MVp is obtained.

In operation (S205), a correct motion prediction vector is output.

The parity of the reference destination of the reference vector and the reference source of the reference vector may be Top Field to Bottom Field, and the parity of the reference destination of the prediction vector and the reference source of the prediction vector may be Top Field to Bottom Field.

Correcting the reference vector MVp_y by +2 yields a corrected reference vector MVp_y'=−6 in the real space, which is indicated by (a). Scaling MVp_y' yields MVp_y"=−2 (half a pixel), which may be a vector indicated by (b) illustrated in FIG. 17 in the Top Field (35). Finally, MVp_y" is corrected by −2 in order to make the resulting vector parallel to the reference vector, and a motion vector MVp_y''' is obtained. The motion vector may correspond to a vector indicated by (c) illustrated in FIG. 17.

Mismatch may occur in parity among three picture, for example, the picture to be encoded including block to be encoded, the picture of the decoded image to which a block to be encoded specified by the reference index refers, and the picture of the decoded image specified by the vector used when a specific block in the picture to be encoded included in a region that has been encoded is encoded.

A description may be omitted of the case where the picture to be encoded is a Top Field, a picture of the decoded image to which a block to be encoded specified by the reference index refers is a Bottom Field, and a picture of the decoded image specified by the vector used when a specific block in the picture to be encoded included in a region that has been encoded is encoded is a Top Field. A description may be omitted of the case where the picture to be encoded is a Top Field, a picture of the decoded image to which a block to be encoded specified by the reference index refers is a Bottom Field, and a picture of the decoded image specified by the vector used when a specific block in the picture to be encoded included in a region that has been encoded is encoded is a Bottom Field.

Figure 18:
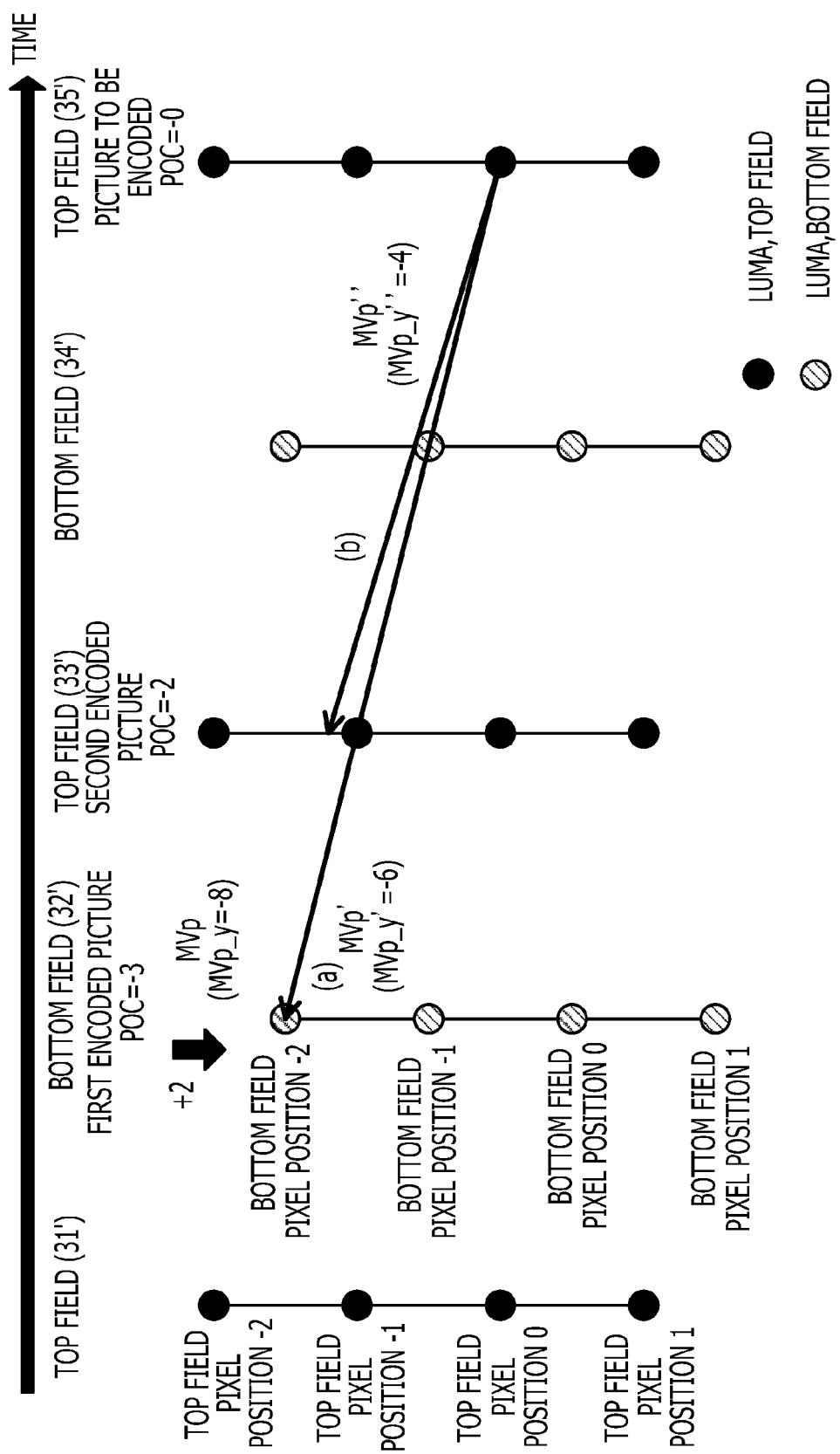
FIG. 18 illustrates an exemplary correction of a motion prediction vector.

FIG. 18 illustrates an exemplary correction of a motion prediction vector. In FIG. 18, the picture to be encoded is a Top Field, a picture of the decoded image to which a block to be encoded specified by the reference index refers is a Top Field, and a picture of the decoded image specified by the vector used when a specific block in the picture to be encoded included in a region that has been encoded is encode is a Bottom Field.

Figure 19:
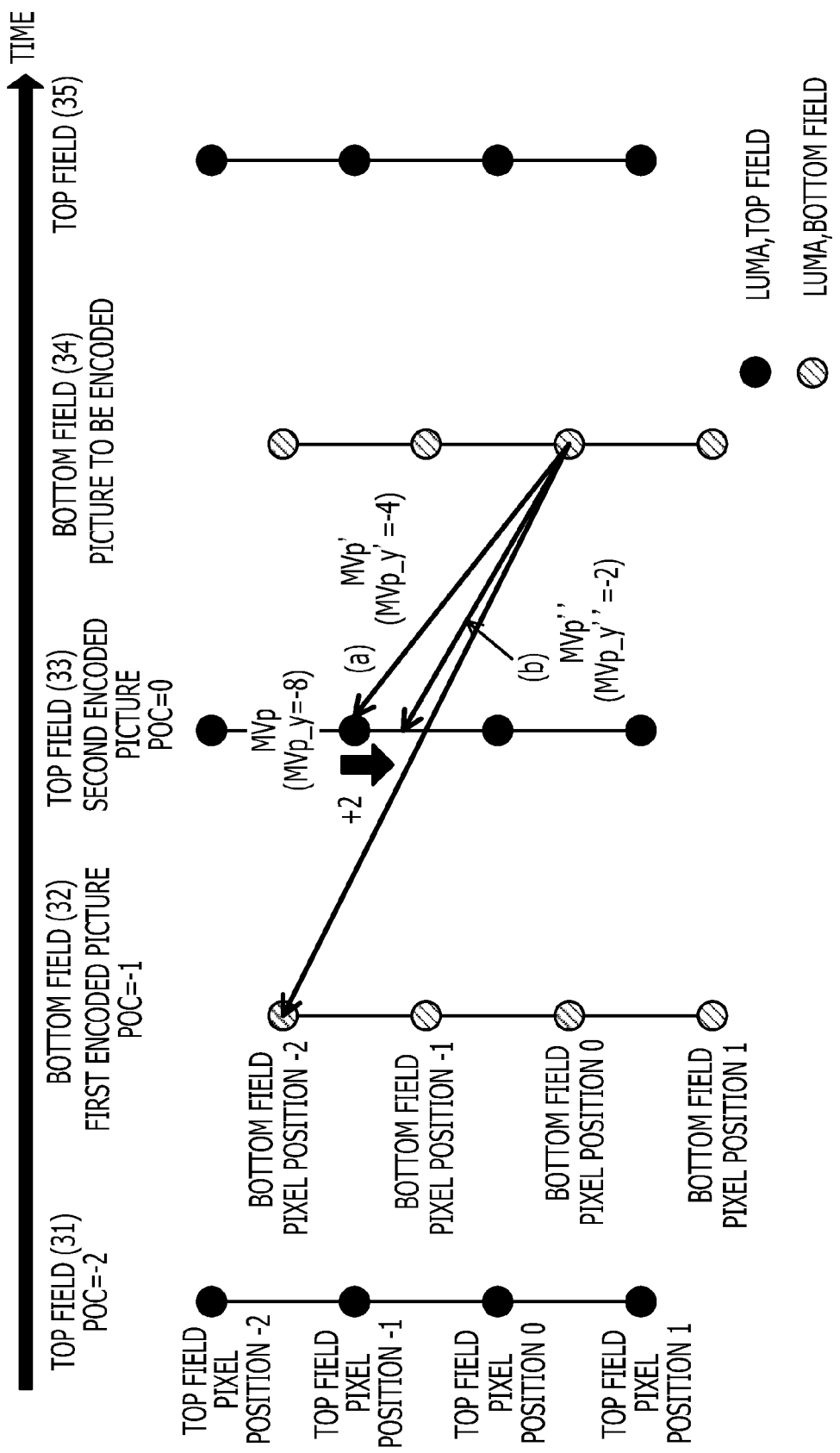
FIG. 19 illustrates an exemplary correction of a motion prediction vector.

FIG. 19 illustrates an exemplary correction of a motion prediction vector. In FIG. 19, the picture to be encoded is a Bottom Field, a picture of the decoded image to which a block to be encoded specified by the reference index refers is a Top Field, and a picture of the decoded image specified by the vector used when a specific block in the picture to be encoded included in a region that has been encoded is encode is encoded is a Bottom Field.

Figure 20:
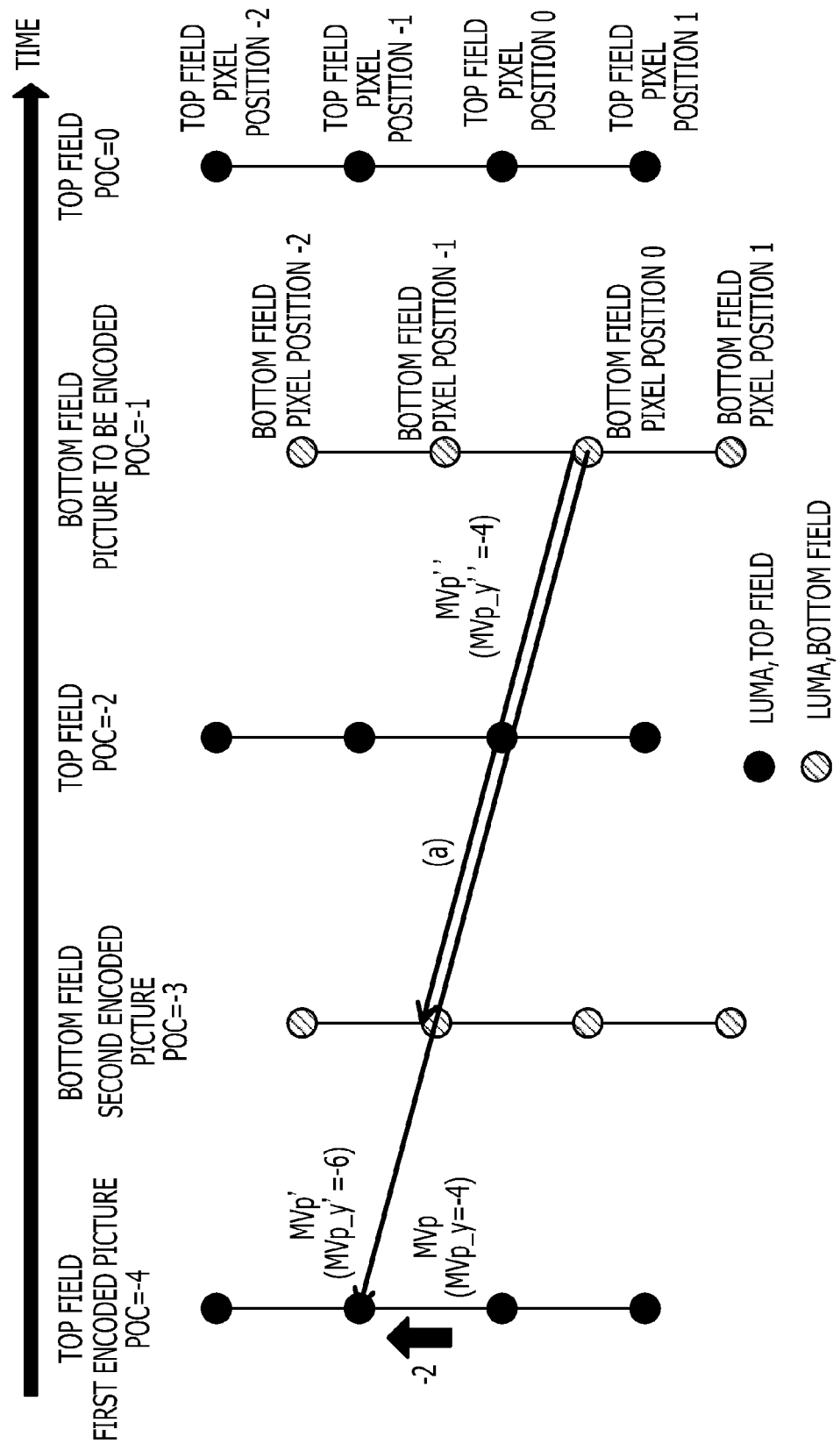
FIG. 20 illustrates an exemplary correction of a motion prediction vector.

FIG. 20 illustrates an exemplary correction of a motion prediction vector. In FIG. 20, the picture to be encoded is a Bottom Field, a picture of the encoded image to which a block to be encoded specified by the reference index refers is a Bottom Field, and a picture of the encoded image specified by the vector used when a specific block in the picture to be encoded included in a region that has been encoded is encode is a Top Field.

Figure 21:
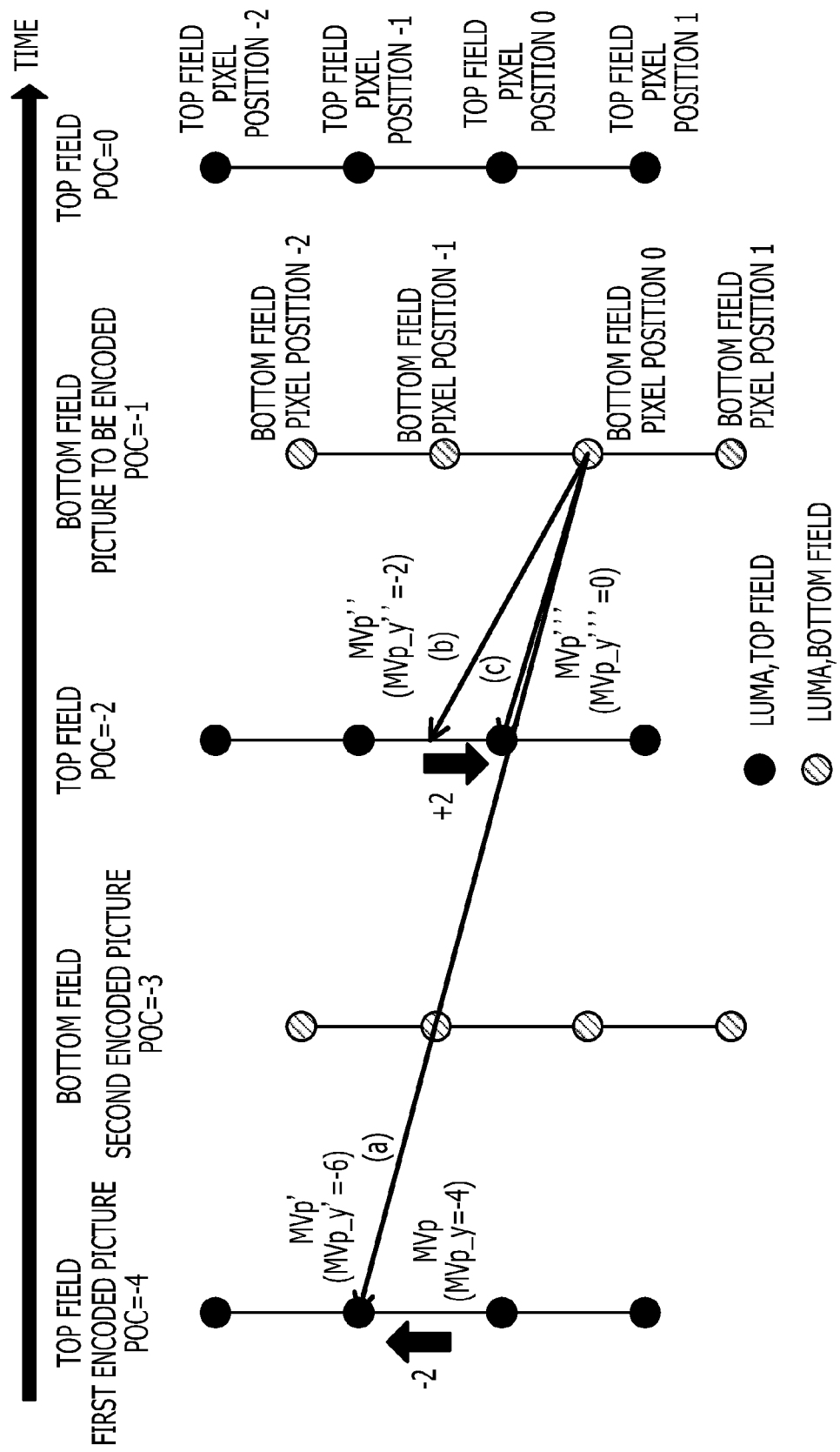
FIG. 21 illustrates an exemplary correction of a motion prediction vector.

FIG. 21 illustrates an exemplary correction of a motion prediction vector. In FIG. 21, the picture to be encoded is a Bottom Field, a picture of the encoded image to which a block to be encoded specified by the reference index refers is a Top Field, and a picture of the encoded image specified by the vector used when a specific block in the picture to be encoded included in a region that has been encoded is encode is encoded is a Top Field.

In FIG. 18, the parity of the reference destination of the reference vector and the reference source of the reference vector is Top Field to Bottom Field, and the parity of the reference destination of the prediction vector the reference source of the prediction vector is Top Field to Bottom Field. Correcting the reference vector MVp_y by +2 yields a corrected reference vector MVp_y'=−6 in the real space, which is indicated by (a). Scaling MVp_y' yields MVp_y"=−4 (one pixel). MVp_y"=−4 (one pixel) corresponds to a vector indicated by (b) in the Top Field (33'), and may be a correct vector for the Top to Bottom Field.

In FIG. 19, the parity of the reference destination of the reference vector and the reference source of the reference vector is Bottom Field to Bottom Field, and the parity of the reference destination of the prediction vector and the reference source of the prediction vector is Bottom Field to Top Field.

Scaling the reference vector MVp_y yields MVp_y'=−4 (one pixel). MVp_y'=−4 (one pixel) is indicated by (a) in the Top field, and through a correction of +2 (½ pixels), a correct vector MVp_y"=−2, indicated by (b), is obtained for the Top Field.

In FIG. 20, the parity of the reference destination of the reference vector and the reference source of the reference vector is Bottom Field to Top Field, and the parity of the reference destination of the prediction vector and the reference source of the prediction vector is Bottom Field to Bottom Field.

Correcting the reference vector MVp_y by −2 yields a corrected reference vector MVp_y'=−6, which is a reference vector in the real space. Scaling MVp_y' yields MVp_y"=−4 (one pixel). MVp_y"=−4 (one pixel) may correspond to a vector indicated by (a) in the Bottom Field, and may correspond to a correct motion prediction vector. In FIG. 21, the parity of the reference destination of the reference vector and the reference source of the reference vector is Bottom Field to Top Field, and the parity of the reference destination of the prediction vector and the reference source of the prediction vector is Bottom Field to Top Field.

Correcting the reference vector MVp_y by −2 yields a corrected reference vector MVp_y'=−6, which is a reference vector in the real space indicated by (a). Scaling MVp_y' yields MVp_y"=−2 (½ pixels). MVp_y"=−2 (½ pixels) is indicated by (b) in the Top Field, and through a correction of +2 (½ pixels), a correct vector, which is indicated by (c), is obtained for the Top to Bottom Field.

Figure 22:
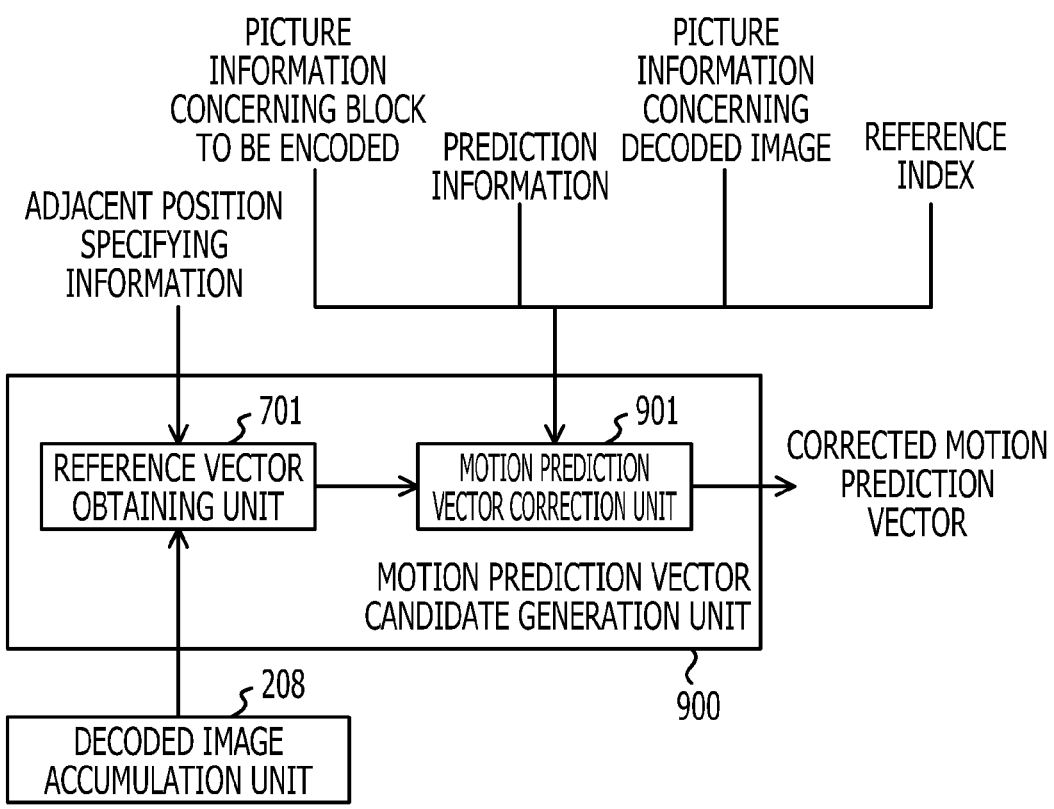
FIG. 22 illustrates an exemplary motion prediction vector candidate generation unit.

If the specified adjacent position is for intra prediction, a motion prediction vector may not be successfully derived, and the number of motion prediction vector candidates may become insufficient. The number of candidates may be compensated by adding a motionless vector (or zero vector). FIG. 22 illustrates an exemplary motion prediction vector candidate generation unit 900.

The motion prediction vector candidate generation unit 900 receives picture information concerning the block to be encoded, picture information concerning the decoded image, prediction information, or adjacent position specifying information, and outputs a corrected motion prediction vector. The motion prediction vector candidate generation unit 900 includes a reference vector obtaining unit 701 and a motion prediction vector correction unit 901. The reference vector obtaining unit 701 receives the adjacent position specifying information and the picture information concerning the block to be encoded and outputs a zero vector as a motion prediction vector when no motion vectors exist, for example, when the reference block at the position specified by the picture information concerning the block to be encoded and the adjacent position specifying information is within intra prediction.

The motion prediction vector correction unit 901 receives the motion prediction vector (or zero vector), the reference index, the picture information concerning the block to be encoded, the picture information concerning the decoded image, or the prediction information, and corrects the motion prediction vector by referring to the parity of the picture to be encoded and the parity of a picture in a second decoded image specified by the reference index. Then, the motion prediction vector correction unit 901 outputs the corrected motion prediction vector.

Figure 23:
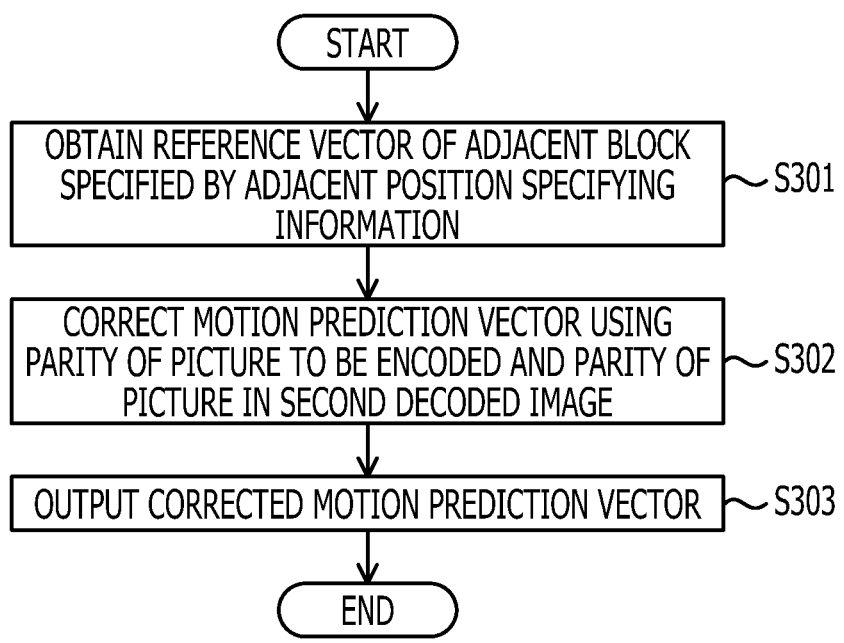
FIG. 23 illustrates an exemplary motion prediction vector candidate generation process.

FIG. 23 illustrates an exemplary motion prediction vector candidate generation process.

In operation (S301), a motion vector MVp=(MVp_x, MVp_y) of a block spatially adjacent to the block to be encoded is obtained from position information concerning the block to be encoded and adjacent position specifying information specifying the position of an adjacent encoded block. The adjacent position to be specified is one of two positions in the MVP mode, for example, left and upper positions. In the merge mode, the adjacent position to be specified is one of four candidates, for example, left, upper, upper right, and lower left positions, or one of up to five positions, for example, left, upper, upper right, lower left, and upper left positions, if a motion prediction vector is not successfully obtained for at least one of the four candidates. If the reference vector is not available because an adjacent block is used for intra prediction and the maximum number of candidates is not sufficient, the zero vector is output as a motion prediction vector MVp".

In operation (S302), MVp_y", which is the y component of the motion prediction vector MVp", is corrected using the input of picture information concerning the block to be encoded, picture information concerning the decoded image, prediction information, or a reference index by taking into account the parity of the picture to be encoded and the parity of a picture in a second decoded image specified by the reference index to generate a corrected motion prediction vector MVp_y'". Formula (22) is used.

$$MVp\_y'''=MVp\_y''+2*(-isBottomFieldCurr-isBottomFieldRef2) \quad (22)$$

A motion prediction vector to which the zero vector MVp" has been correctly scaled is obtained.

In operation (S303), a correct motion prediction vector is output.

Figure 24:
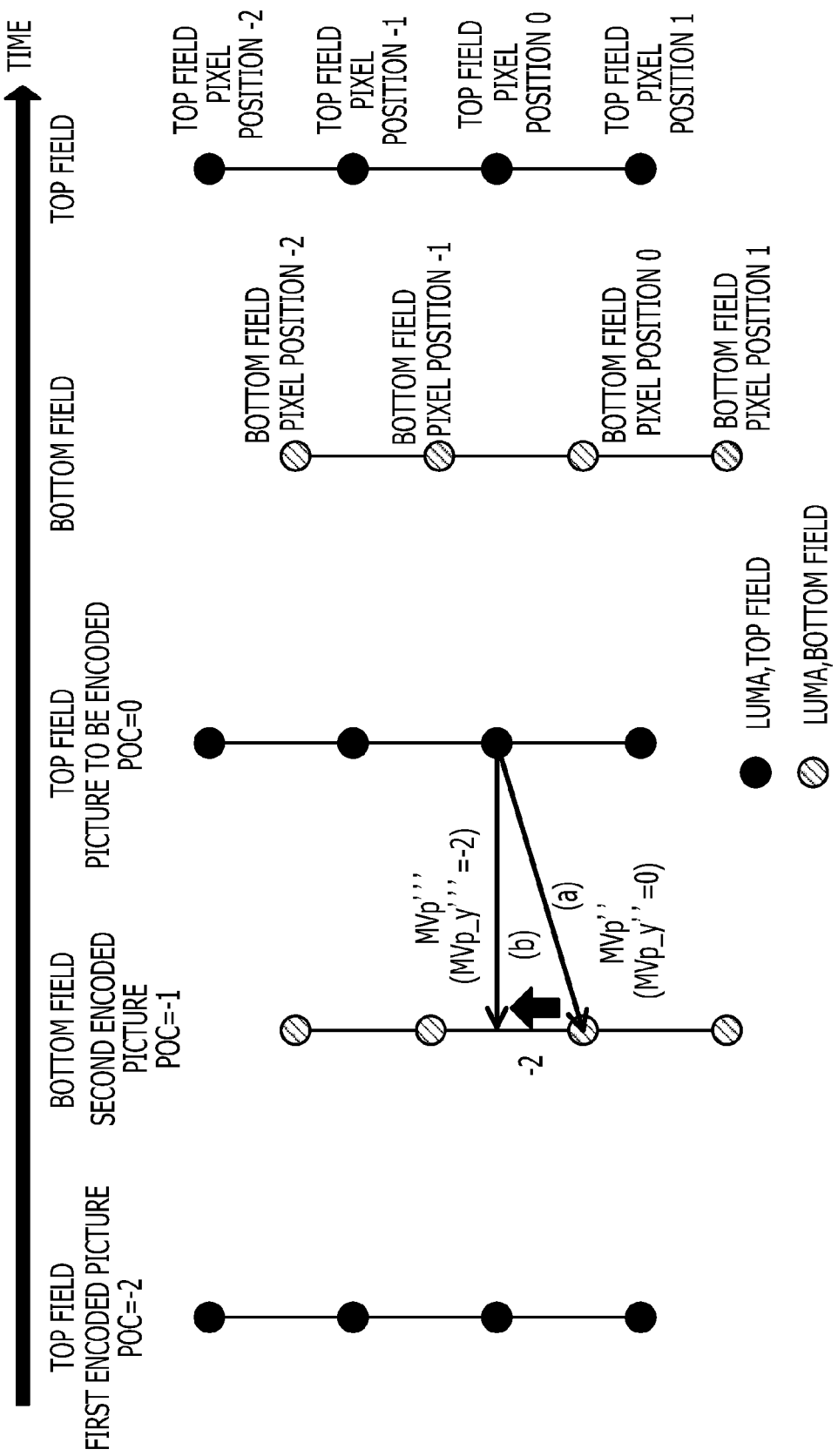
FIG. 24 illustrates an exemplary correction of a motion prediction vector.

FIG. 24 illustrates an exemplary correction of a motion prediction vector.

In the case where a zero vector is used as a motion prediction vector, if MVp_y"=0, as in FIG. 24, a vector indicated by (a) may be obtained when a reference from Top Field to Bottom Field is made, and a vector different from the intended vector may be obtained.

The y component MVp_y" of the motion prediction vector (or zero vector) MVp" is corrected based on the parity of the picture to be encoded and the parity of the picture in the first decoded image, and a corrected motion prediction vector MVp_y'" is obtained. Formula (23) is used.

$$MVp\_y'''=0+2*(-0-1)=-2 \quad (23)$$

The vector, which represents ½ pixels, serves as a vector indicated by (b) illustrated in FIG. 24 when pointing from Top Field to Bottom Field, and corresponds to a motion vector to which the reference vector has been correctly scaled.

In FIG. 24, in the case where the reference source (Current) is a Top Field and the reference destination (Reference) is a Bottom Field, if MVp_y"=0, as indicated by (a) illustrated in FIG. 24, a vector shifted by ½ pixels is generated.

Correcting MVp_y" by -2 (½ pixels) yields a motion prediction vector indicated by (b).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A video encoding apparatus comprising:
a reference vector deriving unit to derive as a reference vector a vector used when encoding a block that is near a block to be encoded and is included in a region where a field picture to be encoded is subjected to encode;
a scaling unit to scale the reference vector based on a temporal distance between the field picture to be encoded and a first encoded field picture specified by the reference vector and a temporal distance between the field picture to be encoded and a second encoded field picture specified by a reference index and referenced by the block to be encoded in the field picture to be encoded to generate a motion prediction vector;
and a motion prediction vector correction unit to correct the motion prediction vector using a parity of the field picture to be encoded, a parity of the first encoded field picture, and a parity of the second encoded field picture to generate a corrected motion prediction vector,
wherein, when a display time of the field picture to be encoded is Curr poc, a display time of the first encoded field picture specified by the reference vector is ref1 poc, and a display time of a second encoded field picture specified by a reference index and referenced by a block to be encoded in the field picture to be encoded is ref2 poc, the scaling unit performs a scaling on the reference vector MVp derived by the reference vector deriving unit using temporal distances of (ref2 poc−Curr poc) and (ref1 poc−Curr poc), and generates a motion prediction vector MVp', and
the motion prediction vector correction unit corrects the motion prediction vector MVp' using a isBottomFieldCurr flag indicating that the field picture to be encoded is a Bottom Field, a isBottomFieldRef1 flag indicating that the first encoded field picture is a Bottom Field, and a isBottomFieldRef2 flag indicating the second encoded field picture is a Bottom Field and generates a corrected motion prediction vector MVp".

2. The video encoding apparatus according to claim 1, wherein motion compensation prediction is performed on a block-by-block basis between two fields included in each frame, and each field is encoded.

3. A video decoding apparatus comprising:
a reference vector deriving unit to derive as a reference vector a vector used when decoding a block that is near a block to be decoded and is included in a region where a field picture is subjected to decode;
a scaling unit to scale the reference vector based on a temporal distance between the field picture to be decoded and a first decoded field picture specified by the reference vector and a temporal distance between the field picture to be decoded and a second decoded field picture specified by a reference index and referenced by the block to be decoded in the field picture to be decoded to generate a motion prediction vector;
and a motion prediction vector correction unit to correct the motion prediction vector using a parity of the field picture to be decoded, a parity of the first decoded field picture, and a parity of the second decoded field picture to generate a corrected motion prediction vector,
wherein, when a display time of the field picture to be encoded is Curr poc, a display time of the first encoded field picture specified by the reference vector is ref1 poc, and a display time of a second encoded field picture specified by a reference index and referenced by a block to be encoded in the field picture to be encoded is ref2 poc, the scaling unit performs a scaling on the reference vector MVp derived by the reference vector deriving unit using temporal distances of (ref2 poc−Curr poc) and (ref1 poc−Curr poc), and generates a motion prediction vector MVp', and the motion prediction vector correction unit corrects the motion prediction vector MVp' using a isBottomField-Curr flag indicating that the field picture to be encoded is a Bottom Field, a isBottomFieldRef1 flag indicating that the first encoded field picture is a Bottom Field, and a isBottomFieldRef2 flag indicating the second encoded field picture is a Bottom Field and generates a corrected motion prediction vector MVp".

4. The video decoding apparatus according to claim 3, wherein motion compensation prediction is performed on a block-by-block basis between two fields included in each frame, and each field is decoded.

5. A video encoding apparatus comprising:
a reference vector deriving unit to output as a reference vector a vector used when encoding a block that is near a block to be encoded and is included in a region where a field picture to be encoded is subjected to encode;
a reference vector correction unit to correct the reference vector using a parity of the field picture to be encoded and a parity of a first encoded field picture specified by the reference vector to generate a corrected reference vector;
a scaling unit to scale the reference vector based on a temporal distance between the field picture to be encoded and the first encoded field picture and a temporal distance between the field picture to be encoded and a second encoded field picture specified by a reference index and referenced by the block to be encoded in the field picture to be encoded to generate a motion prediction vector; and
a motion prediction vector correction unit to correct the motion prediction vector using a parity of the field picture to be encoded and a parity of the second encoded field picture to generate a corrected motion prediction vector,
wherein the reference vector correction unit corrects the reference vector derived by the reference vector deriving unit using a isBottomFieldCurr flag indicating that the parity of the field picture to be encoded is a Bottom Field and a isBottomFieldRef flag indicating that the parity of the first encoded field picture pointed by the reference vector is a Bottom Field and generates a corrected reference vector MVp',
the scaling unit scales the corrected reference vector MVp' and generates a motion prediction vector MVp", and
the motion prediction vector correction unit corrects the motion prediction vector MVp" using the isBottomFieldCurr and a isBottomFieldRef2 flag indicating that the parity of the second encoded field picture is a Bottom Field and generates a corrected motion prediction vector MVp'".

6. The video encoding apparatus according to claim 5, wherein motion compensation prediction is performed on a block-by-block basis between two fields included in each frame, and each field is encoded.

7. A video decoding apparatus comprising:
a reference vector deriving unit to output as a reference vector a vector used when decoding a block that is near a block to be decoded and is included in a region where a field picture is subjected to decode;
a reference vector correction unit to correct the reference vector using a parity of the field picture to be decoded and a parity of a first decoded field picture specified by the reference vector to generate a corrected reference vector;
a scaling unit to scale the reference vector based on a temporal distance between the field picture to be decoded and the first decoded field picture and a temporal distance between the field picture to be decoded and a second decoded field picture specified by a reference index and referenced by the block to be decoded in the field picture to be decoded to generate a motion prediction vector; and
a motion prediction vector correction unit to correct the motion prediction vector using a parity of the field picture to be decoded and a parity of the second decoded field picture to generate a corrected motion prediction vector,
wherein the reference vector correction unit corrects the reference vector derived by the reference vector deriving unit using a isBottomFieldCurr flag indicating that the parity of the field picture to be encoded is a Bottom Field and a isBottomFieldRef flag indicating that the parity of the first encoded field picture pointed by the reference vector is a Bottom Field and generates a corrected reference vector MVp',
the scaling unit scales the corrected reference vector MVp' and generates a motion prediction vector MVp", and
the motion prediction vector correction unit corrects the motion prediction vector MVp" using the isBottomFieldCurr and a isBottomFieldRef2 flap indicating that the parity of the second encoded field picture is a Bottom Field and generates a corrected motion prediction vector MVp'".

8. The video decoding according to claim 7, wherein motion compensation prediction is performed on a block-by-block basis between two fields included in each frame, and each field is encoded.

9. The video encoding apparatus according to claim 1, wherein the scaling unit perform MVp'=MVp*(ref2 poc−Curr poc)/(ref1 poc−Curr poc) on the reference vector MVp to generate a motion prediction vector MVp', and
the motion prediction vector correction unit corrects the motion prediction vector MVp' by performing MVp"=MVp'+2*(isBottomFieldRef1−isBottomFieldCurr)*(ref2 poc−Curr poc)/(ref1 poc−Curr poc)+2*(−isBottomFieldCurr−isBottomFieldRef2).

10. The video decoding apparatus according to claim 3, wherein the scaling unit perform MVp'=MVp*(ref2 poc−Curr poc)/(ref1 poc−Curr poc) on the reference vector MVp to generate a motion prediction vector MVp', and
the motion prediction vector correction unit corrects the motion prediction vector MVp' by performing MVp"=MVp'+2*(isBottomFieldRef1−isBottomFieldCurr)*(ref2 poc−Curr poc)/(ref1 poc−Curr poc)+2*(−isBottomFieldCurr−isBottomFieldRef2).

11. The video encoding apparatus according to claim 5, wherein the reference vector correction unit corrects the reference vector by performing MVp'=MVp+2*(−isBottomFieldRef−isBottomFieldCurr), and
the motion prediction vector correction unit corrects the motion prediction vector MVp" by performing MVp'"=MVp"+2*(−isBottomFieldCurr−isBottomFieldRef2).

12. The video decoding apparatus according to claim 7, wherein the reference vector correction unit corrects the reference vector by performing MVp'=MVp+2*(−isBottomFieldRef−isBottomFieldCurr), and the motion prediction vector correction unit corrects the motion prediction vector MVp" by performing MVp'''=MVp"+2*(−isBottomFieldCurr−isBottomFieldRef2).

13. The video encoding apparatus according to claim 5, wherein the motion prediction vector correction unit corrects the motion prediction vector in parallel to a correction of the reference vector using the parity of the field picture to be encoded, the parity of the first encoded field picture and the parity of the second encoded field picture to generate the corrected motion prediction vector.

14. The video decoding apparatus according to claim 7, wherein the motion prediction vector correction unit corrects the motion prediction vector in parallel to a correction of the reference vector using the parity of the field picture to be decoded, the parity of the first encoded field picture and the parity of the second decoded field picture to generate the corrected motion prediction vector.

* * * * *